: US007823911B2

(12) United States Patent
Adachi et al.

(10) Patent No.: US 7,823,911 B2
(45) Date of Patent: Nov. 2, 2010

(54) KNEE PROTECTING AIR BAG APPARATUS

(75) Inventors: Yuichi Adachi, Aichi-ken (JP); Kazuaki Bito, Aichi-ken (JP); Osamu Fukawatase, Aichi-ken (JP); Kenji Imamura, Kosai (JP); Akiyoshi Sanada, Aichi-ken (JP)

(73) Assignees: Toyoda Gosei Co., Ltd., Aichi-pref. (JP); Toyota Jidosha Kabushiki Kaisha, Toyota-shi (JP)

( * ) Notice: Subject to any disclaimer, the term of this patent is extended or adjusted under 35 U.S.C. 154(b) by 191 days.

(21) Appl. No.: 11/976,502

(22) Filed: Oct. 25, 2007

(65) Prior Publication Data

US 2008/0100042 A1    May 1, 2008

(30) Foreign Application Priority Data

Oct. 31, 2006    (JP)  .............................. 2006-295810

(51) Int. Cl.
    *B60R 21/20*    (2006.01)
    *B60R 21/203*   (2006.01)
(52) U.S. Cl. ................. 280/730.1; 280/728.3; 280/736; 280/740; 280/742
(58) Field of Classification Search .............. 280/728.3, 280/730.1, 736, 740, 742
    See application file for complete search history.

(56) References Cited

U.S. PATENT DOCUMENTS 5,172,933 A * 12/1992 Strasser ...................... 280/740
5,570,901 A    11/1996 Fyrainer
6,938,919 B2    9/2005 Abe
6,945,562 B2 *  9/2005 Abe ........................ 280/743.1
7,182,365 B2 *  2/2007 Takimoto et al. ......... 280/730.1

(Continued)

FOREIGN PATENT DOCUMENTS

DE        102 50 405 A1    5/2003

(Continued)

OTHER PUBLICATIONS

Office Action dated Aug. 13, 2008 in corresponding Japanese patent application No. 2006-295810 (and English translation).

(Continued)

*Primary Examiner*—Paul N Dickson
*Assistant Examiner*—James English
(74) *Attorney, Agent, or Firm*—Posz Law Group, PLC

(57) ABSTRACT

A knee protecting air bag apparatus M1 is mounted to a column cover 16 for covering a column cover 16 for covering a steering column. In operating the apparatus M1, a contained air bag 45 is supplied with an expanding gas G and is projected from the column cover 16 to be able to protect the knee of a driver while being expanded to develop. The column cover 16 includes a door portion 34 opened by being pressed by the air bag to be able to form a projecting opening 22 of the air bag 45 at two left ad right side faces 18b, 18c from a side of a lower face 18a. Inside of the air bag 45 is arranged with a gas flow restricting member 64 such that the expanding gas G is made to flow to a left door portion 36 and a right door portion 37 of the door portion 34 by being directed in outer directions of both left and right sides.

11 Claims, 20 Drawing Sheets

U.S. PATENT DOCUMENTS

| | | | |
|---|---|---|---|
| 7,530,597 B2 * | 5/2009 | Bito ........................... 280/742 |
| 2003/0178819 A1 * | 9/2003 | Schneider et al. ........ 280/728.3 |
| 2003/0184069 A1 | 10/2003 | Takimoto et al. |
| 2004/0075253 A1 * | 4/2004 | Morita ..................... 280/730.1 |

FOREIGN PATENT DOCUMENTS

| | | |
|---|---|---|
| EP | 1 300 300 A1 | 4/2003 |
| EP | 1 452 407 B1 | 6/2006 |
| JP | A-8-301054 | 11/1996 |
| JP | A-9-104317 | 4/1997 |
| JP | A-10-71911 | 3/1998 |
| JP | A-2001-106013 | 4/2001 |
| JP | A-2002-37003 | 2/2002 |
| JP | A-2003-237525 | 8/2003 |
| JP | A-2004-67024 | 3/2004 |
| JP | A-2005-247001 | 9/2005 |
| JP | A-2006-021703 | 1/2006 |

OTHER PUBLICATIONS

Office Action mailed on Feb. 25, 2010 issued from the German Patent Office in the corresponding German patent application No. 10 2007 050 614.9-56 (with English translation).

* cited by examiner

KNEE PROTECTING AIR BAG APPARATUS

BACKGROUND OF THE INVENTION

1. Field of the Invention

The present invention relates to a knee protecting air bag for protecting the knee of a driver by an expanded air bag in collision of a vehicle, particularly relates to a knee protecting air bag attached to a steering column for containing a folded air bag at inside of a column cover arranged to cover the steering column.

2. Description of the Related Art

In a background art, a knee protecting air bag apparatus attached to a steering column is constructed by a constitution in which a folded air bag is contained on a lower portion side of a column cover and in being operated, the air bag is supplied with an expanding gas, and the air bag is projected from the column cover to be arranged on a front side of the knee of a driver while being expanded to develop (refer to, for example, JP-A-2002-37003).

According to the knee protecting air bag apparatus of the background art, in being operated, an inflator arranged at inside of the air bag injects the expanding gas in a skewed lower direction on both left and right sides, the air bag is operated to protect the knee of the driver against a column cover by being expanded to develop radially from substantially a center of the column cover to widen the both knees of the driver by the expanded air bag.

However, depending on a clothing or an attitude of being seated of the driver, there is a case in which the both knees cannot be widened in expanding the air bag and in such a case, protection of the knees becomes insufficient.

Therefore, it is preferable that the air bag protects the both knees of the driver against the column cover or an instrument panel at a surrounding thereof by being developed widely in a width direction in a left and right direction on a front side of the both knees of the driver.

However, the column cover per se for containing the air bag is proximate to the both knees of the seated driver, and therefore, the air bag projected from the column cover is liable to be brought into contact with the knees of the driver and according to the knee protecting air bag apparatus of the background art, a problem is posed in that the air bag is developed widely in the width direction in the left and right direction on the front side of the both knees of the driver.

SUMMARY OF THE INVENTION

The invention resolves the above-described problem and it is an object thereof to provide a knee protecting air bag apparatus in which an air bag projected from a column cover can smoothly be expanded to be expanded to develop widely in a width direction in a left and right direction at an initial stage of expansion and further to increase a thickness thereof.

A knee protecting air bag apparatus according to the invention is characterized in a knee protecting air bag apparatus constructed by a constitution in which the knee protecting air bag apparatus is mounted to a lower portion side of a column cover for covering a steering column, a folded air bag is contained on the lower portion side at inside of the column cover, when the knee protecting air bag apparatus is operated, the air bag is supplied with an expanding gas, and the air bag is projected from the column cover to be arranged on a front side of the knee of a driver while being expanded to develop;

wherein the column cover includes a door portion opened by being pressed by the air bag to be able to form a projecting opening for projecting the air bag when the air bag is expanded at an area from the lower face side over to both left and right side faces thereof; and wherein a gas flow restricting member is arranged at inside of the air bag to expand the air bag by making the expanding gas at inside of the air bag flow from a vicinity of a center in a left and right direction of the column cover to portions of the two left and right side faces of the column cover at the door portion by being directed in outer directions of the both left and right sides.

According to the knee protecting air bag apparatus of the invention, when the expanding gas is supplied to the air bag in being operated, at inside of the air bag, by the gas flow restricting member, the expanding gas flows from the vicinity of the center in the left and right direction of the column cover to the portions of the both left and right side faces of the column cover at the door portion in outer directions of the both left and right sides. Therefore, the air bag folded to be contained at inside of the column cover presses to open the portions of the both left and right side faces of the column cover at the door portion and is projected from the column cover in the outer directions of the both left and right sides at an initial stage of expansion. Thereafter, the air bag is further supplied with the expanding gas directed to the both sides in the left and right directions to develop widely in the width direction on the both left and right sides, presses to open a portion of the lower face of the column cover at the door portion to bulge to increase a thickness thereof. Further, although the portion of the lower face of the column cover at the door portion may be opened substantially simultaneously with the portions of the both left and right side faces of the column cover at the door portion, the air bag per se carries out a behavior of being expanded to develop widely in the width on the both left and right sides by the expanding gas directed to the both sides in the left and right directions and is bulged to a rear side (driver side; lower side).

Therefore, according to the knee protecting air bag apparatus of the invention, the air bag projected from the column cover is expanded to develop widely in the width direction in the left and right directions at the initial stage of expansion and is expanded further increase the thickness, and therefore, even when the column cover is proximate to the both knees of the seated driver, the air bag can be smoothly expanded to be arranged on the front side of the both knees of the driver.

Further, when the knee protecting air bag apparatus includes an inflator for supplying the expanding gas, the inflator may be constituted by a main body having a gas injection port for injecting the expanding gas, and a diffuser connected to the main body for restricting a flow out direction of the expanding gas injected from the gas injection port and the gas flow restricting member may be constituted by the diffuser. In this way, when the gas flow restricting member is constituted by the diffuser of the inflator, the diffuser can be formed by a metal member having a rigidity, and therefore, the flow out direction of the expanding gas can be stabilized from start of operation.

Further, when the point is not taken into consideration, the gas flow restricting member may be constituted by a flow rectifying cloth arranged at inside of the air bag to be able to be folded integrally with the air bag.

Further, when the gas flow restricting member is constituted by the diffuser of the inflator, the main body of the inflator can be constituted such that the main body is formed in a shape of a rod having a head portion provided with the gas injection port at a front end thereof, the diffuser is formed by a shape of a cylinder an axial direction of which is arranged in the left and right direction, a side of the head portion of the main body is inserted to a vicinity of a center in the left and right direction, and openings at both left and right ends are constituted as flow out ports for making the expanding gas at inside of the air bag flow to the portions on the both left and right side faces of the column cover.

According to such a constitution, the main body of the inflator is constituted by a rod-like member of a cylinder type including the head portion provided with the gas injection port at the front end in the axial direction, and the axial direction can be arranged in a direction orthogonal to the axial direction of the diffuser in the cylindrical shape, that is, a front and rear direction or an up and down direction orthogonal to the left and right direction, a space of arranging the main body of the inflator in the left and right direction at inside of the column cover can be narrowed, which is preferable for mounting the knee protecting air bag apparatus at inside of the column cover narrowing the space in the left and right direction.

In this case, when the inflator is arranged by arranging the main body to a lower side of the steering column along a vertical face along the axial direction of the steering column, the inflator can be arranged at the vicinity of the center in the left and right direction of the column cover by avoiding the inflator from being projected from right below of a column tube or the like of the steering column in left and right directions as less as possible, the knee protecting air bag apparatus can easily be mounted to the column cover without widening the width dimension in the left and right direction of the column cover.

Further, when the diffuser is constituted by constituting the directions of the expanding gas flowing to the both left and right sides by left and right directions constituting directions reverse to each other as a horizontal direction, the diffuser can be formed from a straight tube (a cylindrical member in a linear shape) capable of arranging the axial direction in the left and right direction, and therefore, the diffuser can easily be fabricated.

Further, it is preferable to constitute the portions of the both left and right side faces of the column cover at the door portion by arranging a lower opening door portion for opening an upper end edge side to the lower side.

When constituted in this way, since when the portions of the both left and right side faces of the column cover at the door portion are opened, in comparison with the upper edge side, opening on a lower edge side is retarded, the air bag projected from the both left and right side faces of the column cover to the both left and right sides is brought into a state of being restricted from being projected to the lower side, and is further promoted to be expanded to develop widely in the width direction in the left and right directions at the initial stage of expansion.

Further, when a space of containing the air bag folded at inside of the column cover is formed by surrounding the both left and right sides by the portions of the both left and right side faces of the column cover at the door portion and surrounding the both front and rear sides by side walls extended in the upper direction from a lower wall of the column cover, it is preferable that at least one of the side walls of the both front and rear sides is arranged by bending both left and right ends to one side in the front and rear direction of expanding the containing space, outer peripheral edges of the portions of the both left and right side faces of the column cover at the door portion are respectively arranged to be proximate to both left and right edges of the side walls bent to be arranged to widen an area of the door portion.

When constituted in this way, at a cross-sectional face of the column cover, in correspondence with making the outer peripheral edges of the portions of the both left and right side faces of the column cover at the door portion proximate to the both edges in the left and right direction of the bent side walls, the areas at the portions of the both left and right side faces of the column cover at the door portion are made to be as large as possible, the air bag projected in the left and right directions can be projected from the both left and right side faces of the widely opened column cover, and the air bag can further smoothly be expanded to develop in the left and right directions at the initial stage of expansion.

Further, when the air bag is constituted by including a driver side wall portion arranged on a side of the driver when the air bag has been finished to expand and a column side wall portion arranged on a side of the column cover, it is preferable that when the air bag is contained, as a constitution of containing the air bag at inside of the column cover by folding both left and right edges to be proximate to a center side as foldings of narrowing a width direction in the left and right direction from a state of overlapping to expand the driver side wall portion and the column side wall portion, portions of folding the both left and right edges of the air bag are arranged to be opposed to a flow of the expanding gas flowing out from the gas flow restricting member at the portions of the both left and right side faces of the column cover at the door portion at inside of the column cover when the air bag is contained.

According to such a constitution, when the expanding gas flows in outer directions on the both left and right sides, the portions of folding the both left and right edges of the air bag are pressed in outer directions of the both left and right sides by expanding gas to press to open the portions of the both left and right side faces of the column cover at the door portion. That is, the portions of folding the both left and right edges of the air bag are pressed by the expanding gas, projected to the both left and right sides of the column cover while pressing to open the portions of the both left and right side faces of the column cover at the door portion, further, the expanding gas in the outer directions of the both left and right sides is made to flow in a state of being jumped from the column cover to a free space, and the air bag can be expanded to develop widely in the width direction in the left and right direction further smoothly at the initial stage of expansion.

In this case, when the portions of folding the both left and right edges of the air bag are respectively formed by folding the both left and right edges by rolls of being rolled to the side of the column side wall portion, the portions of folding the both left and right edges of the air bag can be developed in the left and right direction along a rear face of the instrument panel on left and right sides of the column cover when the folding is released, and the air bag can be expanded to develop widely in the left and right direction further smoothly without being proximate to the side of the driver.

DESCRIPTION OF THE PREFERRED EMBODIMENTS

Figure 14A:
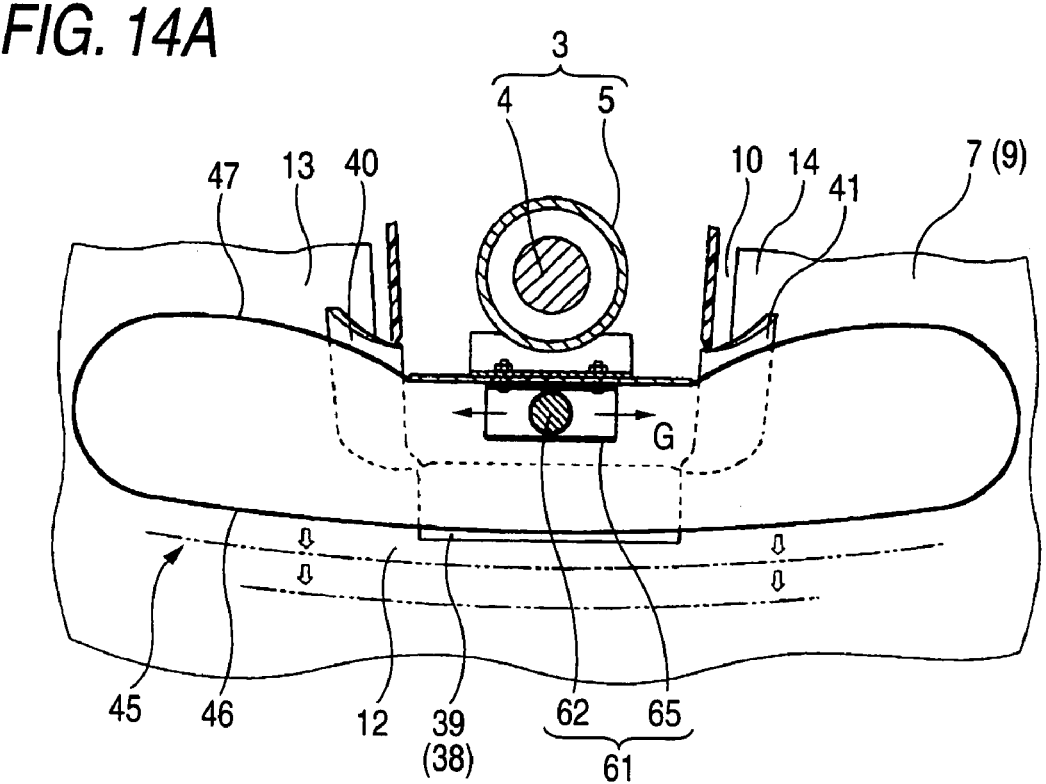
FIG. 14 illustrates outline vertical sectional views successively showing the occasion of operating the knee protecting air bag apparatus of the embodiment, showing a state after FIG. 13.
Figure 14B:
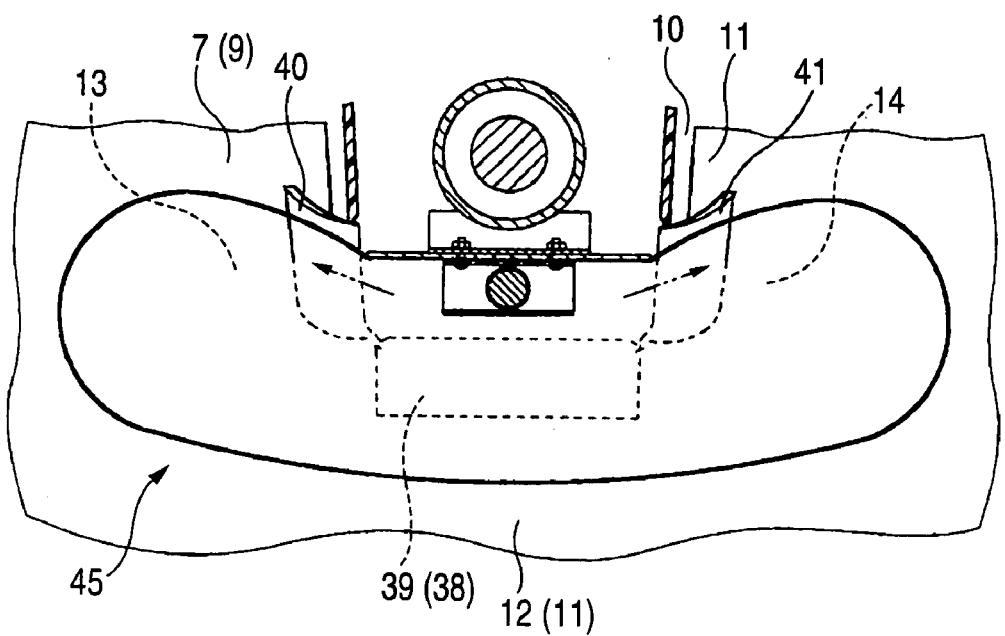
Figure 15A:
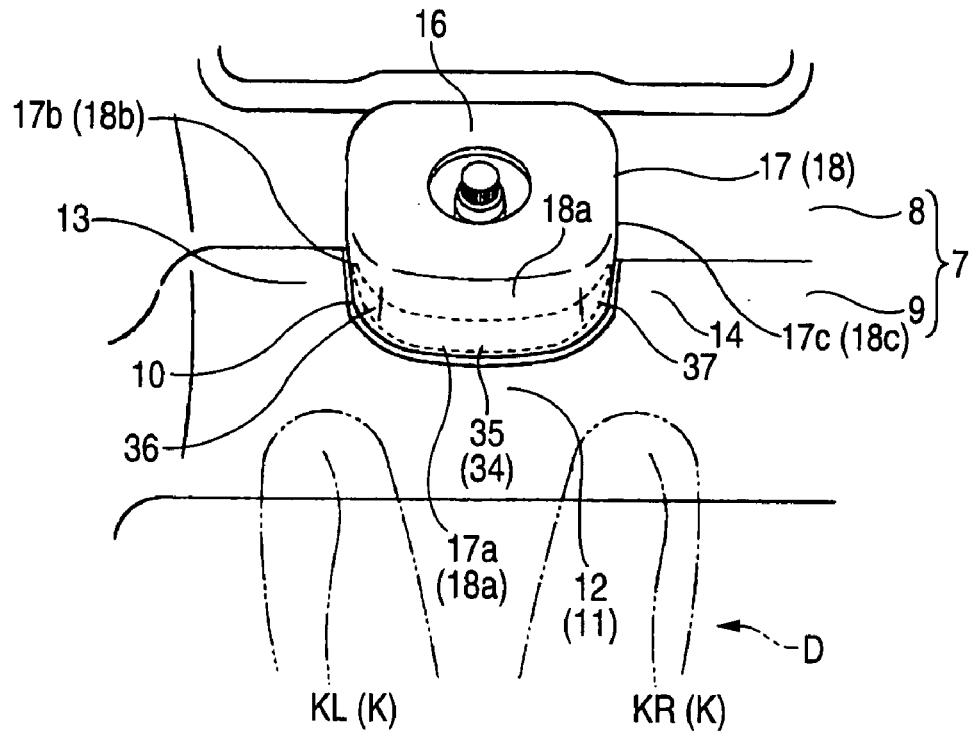
FIG. 15 illustrates outline front views viewed from a rear side successively showing the occasion of operating the knee protecting air bag apparatus of the embodiment.
Figure 15B:
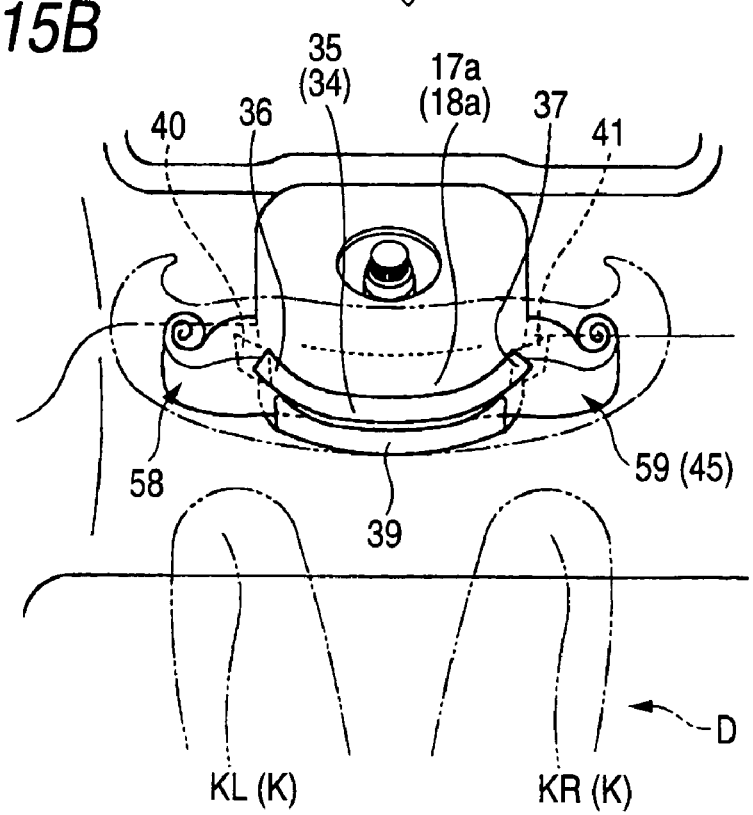

Explaining an embodiment of the invention in reference to the drawings as follows, a knee protecting air bag apparatus M1 of the embodiment is constituted by containing a folded air bag 45 on a side of a lower portion 16a at inside of a column cover 16. The knee protecting air bag apparatus M1 is constituted by including the folded air bag 45, an inflator 61 for supplying an expanding gas of the air bag 45, a case 71 for containing the air bag 45 and the inflator 61, and is constituted such that the air bag 45 in being expanded presses to open a door portion 34 provided at the column cover 16 to be arranged on a front side of the both knees K (KL, KR) of a seated driver D (refer to FIG. 14).

As shown in FIGS. 1, 3, 5, 6, and 15, the column cover 16 is made of a synthetic resin substantially in a shape of a square cylinder for covering a steering column 3 and is attached to a column tube 5 of the steering column 3 at a position, not illustrated, projected to a rear side from an opening 10 for containing an instrument panel (hereinafter, referred to as inpane) 7, inclined such that a front end side is disposed on a lower side and a rear end side is disposed on an upper side to be along an axial direction O (refer to FIG. 2) of the steering column 3 and is arranged on a front side of the seated driver D. Further, the steering column 3 includes a main shaft 4 and the column tube 5 arranged at a surrounding thereof, and the main shaft 4 is connected with a steering wheel 1. The inpane 7 is constituted by an upper panel 8 on an upper side and a lower panel 9 on a lower side.

Figure 5:
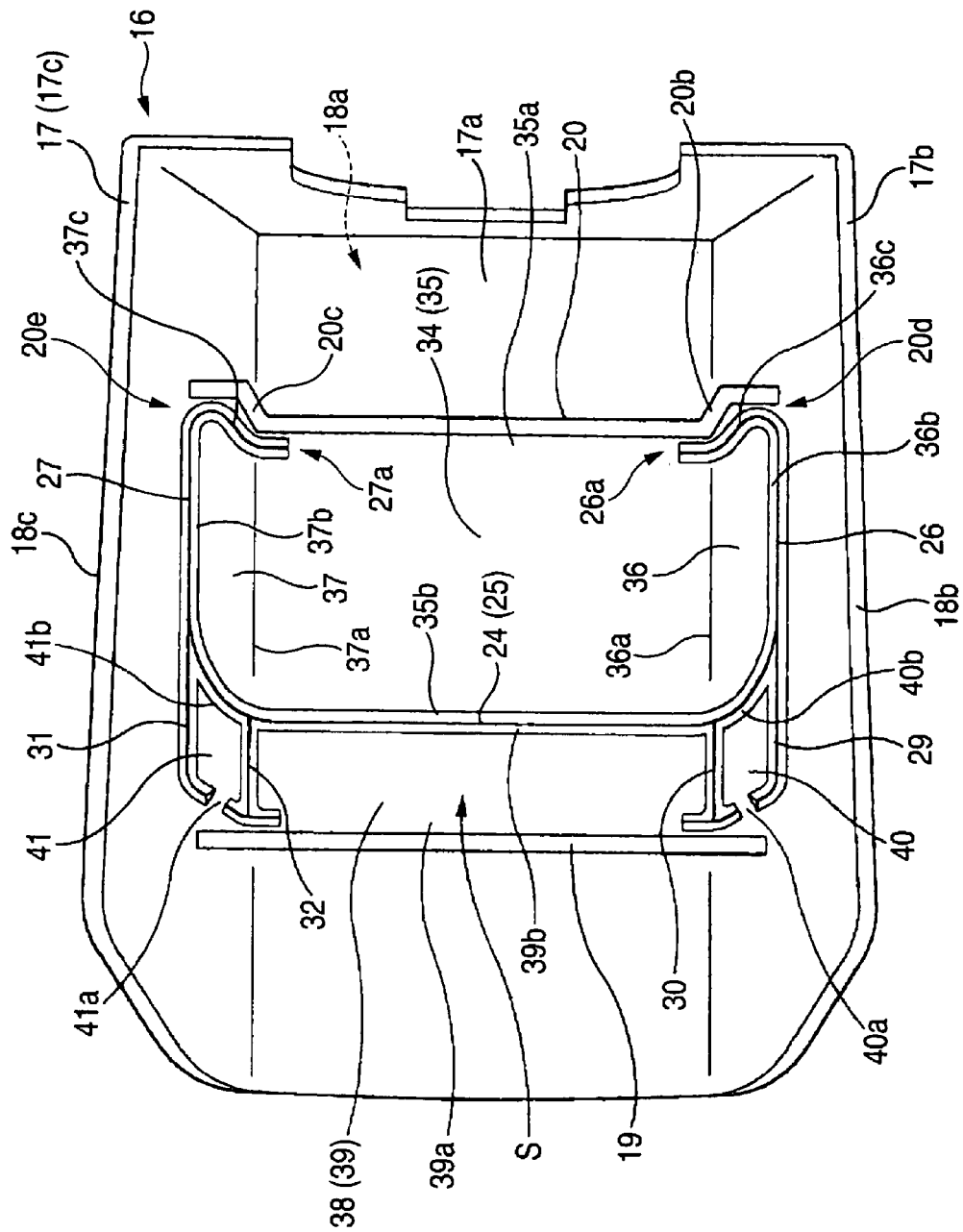
FIG. 5 is a plane view of a lower side portion of the column cover used in the knee protecting air bag apparatus of the embodiment.
Figure 6:
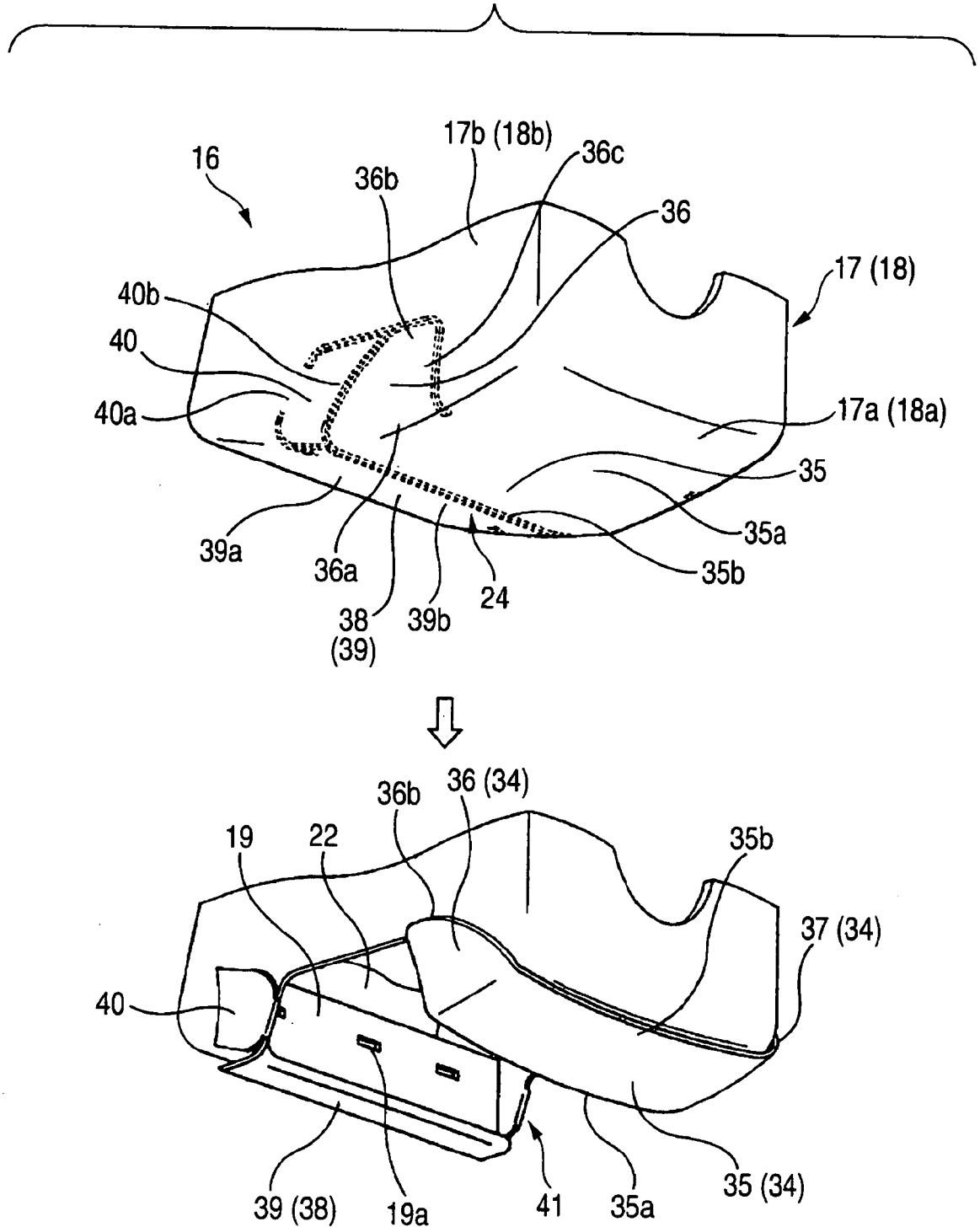
FIG. 6 is a perspective view showing a state before opening a door portion of a column cover used in the knee protecting air bag apparatus of the embodiment and a state of opening the door portion.

Further, as shown by FIGS. 5, 6, the column cover 16 is arranged with the door portion 34 opened by being pressed by the air bag 45 to be able to form a one projecting opening 22 in projecting the air bag 45 at an area over to a left side face 18b and a right side face 18c from a side of a lower side face 18a of an outer peripheral face 18. The door portion 34 is constituted by a lower door portion 35 arranged on a side of the lower face 18a of the column cover 16, a left door portion 36 arranged on a side of the left side face 18b of the column cover 16, a right door portion 37 arranged on a side of the left side face 18b of the column cover 16 which are arranged on a rear side of rear faces 12, 13, 14 of the inpane 7 (refer to FIGS. 1, 15) and is formed with a breakage scheduled portion 24 capable of being broken by being pressed by the expanding air bag 45 at a surrounding thereof.

The breakage scheduled portion 24 is constituted by providing a recess groove in a line-like shape continuous to a side of an inner peripheral face of the column cover 16 to thin a wall thickness of the column cover 16. The breakage scheduled portion 24 is constituted by a lateral line portion 25 arranged along a left and right direction at a lower wall 17a of the peripheral wall 17, and a left edge line portion 26, a right edge line portion 27 arranged to extend from both left and right ends of the lateral line portion 25 to a rear side in an inverse U-like shape at a left side wall 17b and a right side wall 17c and left and right sides of the column cover 16. The lateral line portion 25 forms a front edge side of the lower door portion 35, and the left edge line portion 26 and the right edge line portion 27 respectively form outer peripheral edges of the left door portion 36 and the right door portion 37.

Further, the lower door portion 35 is arranged to be opened by lower opening to rotate a side of a front edge 35b in a lower direction and to a rear side by constituting a hinge portion 35a by a portion of connecting front ends 26a, 27a of the left edge line portion 26 and the right edge line portion 27 remote from the lateral line portion 25. The left door portion 36 and the right door portion 37 are arranged such that hinge portions 36a, 37a are arranged at positions of left and right edges of the lower door portion 35, that is, at positions at which the left side wall 17b and the right side wall 17c, and the lower wall 17a of the column cover 16 before opening the door portion 34 are intersected to rotate to open sides of upper edges 36b, 37b in a lower direction.

Figure 16A:
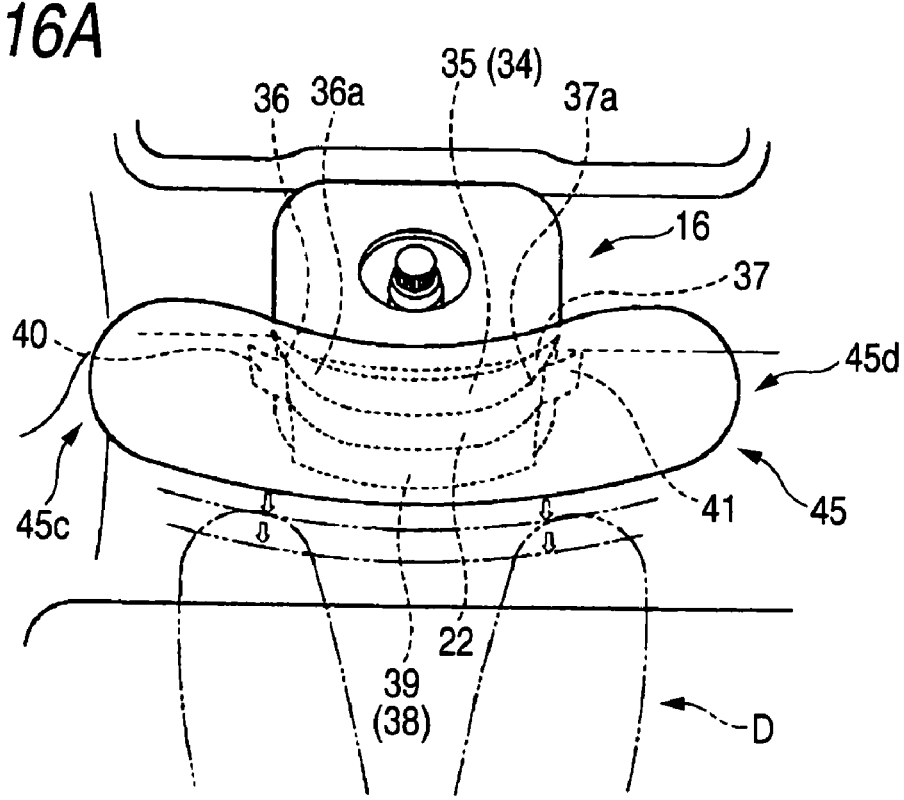
FIG. 16 illustrates outline front views viewed from the rear side successively showing the occasion of operating the knee protecting air bag apparatus of the embodiment, showing a state after FIG. 15.
Figure 16B:
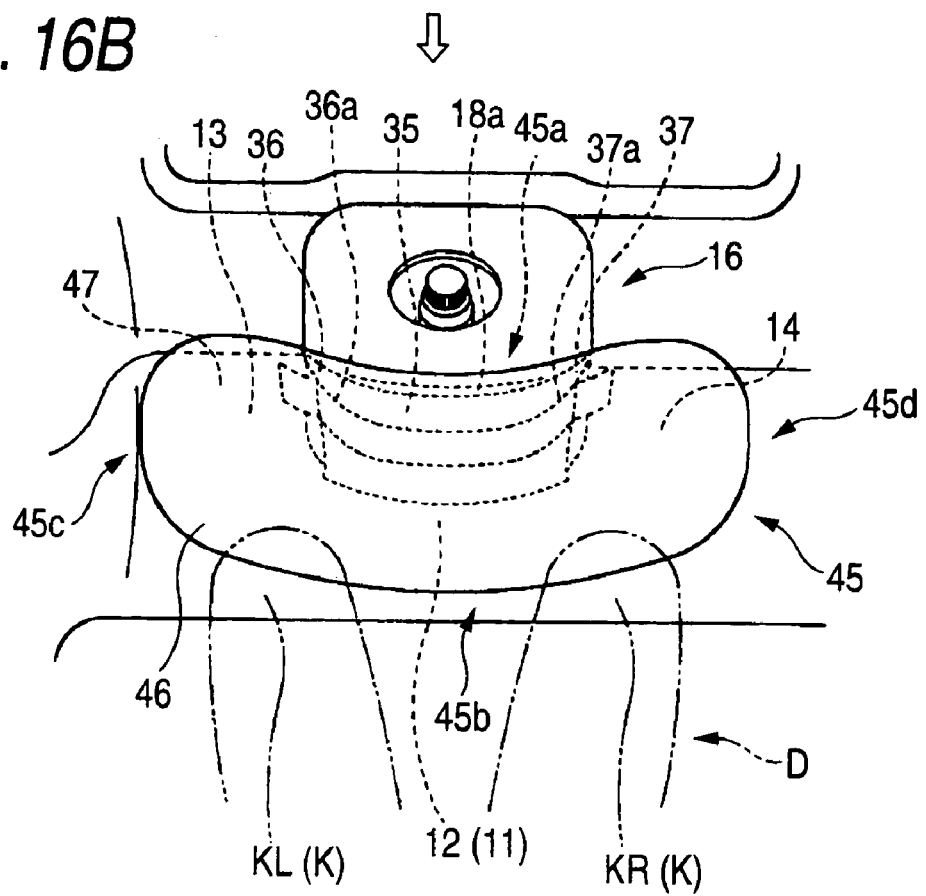
Figure 17:
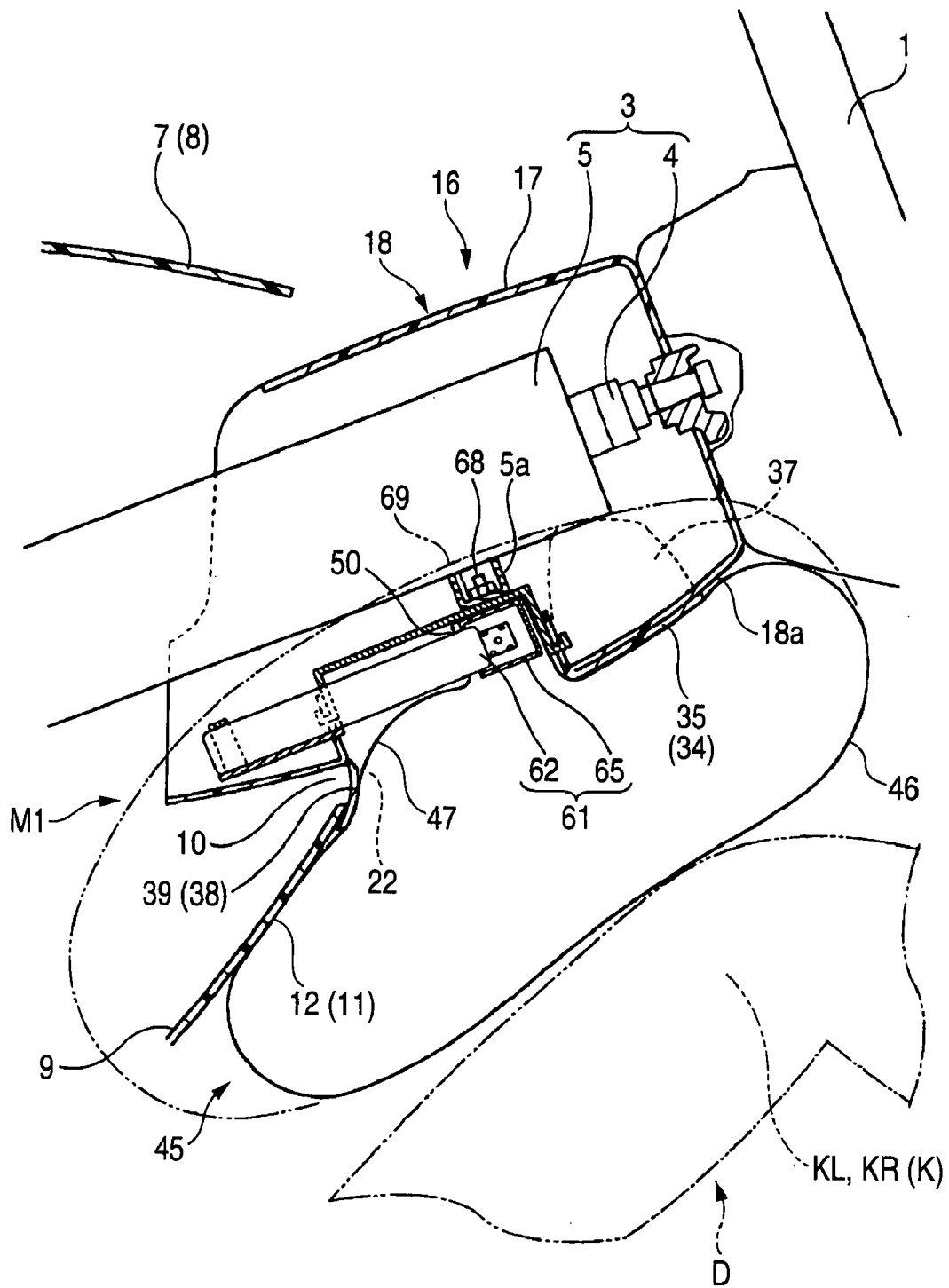
FIG. 17 is an outline enlarged vertical sectional view along a front and rear direction showing an occasion of finishing to operate the knee protecting air bag apparatus of the embodiment.

Further, according to the embodiment, the left door portion 36 and the right door portion 37 are connected to the lower door portion 35 opened to the lower direction and on the rear side by arranging the hinge portion 36a, 37a at the left and right edges of the lower door portion 35, and therefore, when the lower door portion 35 is finished to be opened to be opened fully to be brought into contact with the lower face 18a of the column cover 16 by constituting a center of rotation by the hinge portion 36a, as shown by FIGS. 6, 16, the left door portion 36 and the right door portion 37 finish opening to be brought into contact with the left side face 18b and the right side face 18c of the column cover 16 by arranging the hinge portions 36a, 37a on the lower edge side.

Further, in the case of the embodiment, as shown by FIGS. 5, 6, 16, the column cover 16 is provided with an auxiliary door portion 38 pressed to be widened by the air bag 45 along with the door portion 34 on the front side of the door portion 34 such that an area of the projecting opening 22 of the air bag 45 can be increased. The auxiliary door portion 38 is constituted by an auxiliary lower door portion 39 arranged on a side of the lower face 18a of the column cover 16, an auxiliary left door portion 40 arranged on a side of the left side face 18b of the column cover 16, and an auxiliary right door portion 41 arranged on a side of the right side face 18c of the column cover 16. The auxiliary lower door portion 39, the auxiliary left door portion 40, and the auxiliary right door portion 41 are arranged to be opened by rotating rear edges 39b, 40b, 41b to the front side by arranging hinge portions 39a, 40a, 41a on front edge sides thereof.

Further, a surrounding of the auxiliary door portion 38 is arranged with an upper left line portion 29, a lower left line portion 30, an upper right line portion 31, and a lower right line portion 32. The upper left line portion 29 is extended to the front side from a vicinity of a top portion bulged to the upper side of the left edge line portion 26 to form an upper edge side of the auxiliary left door portion 40, the upper right line portion 31 is extended to the front side from the vicinity of a top portion bulged to the upper side of the right edge line portion 27 to form an upper edge side of the auxiliary right door portion 41. Further, the lower left line portion 30 and the lower right line portion 32 are respectively extended to the front side from both left and right ends of the lateral line portion 25 to form two left and right edge sides of the auxiliary lower door portion 39 (lower edge sides of the auxiliary left door portion 40 and the auxiliary right door portion 41).

Figure 1:
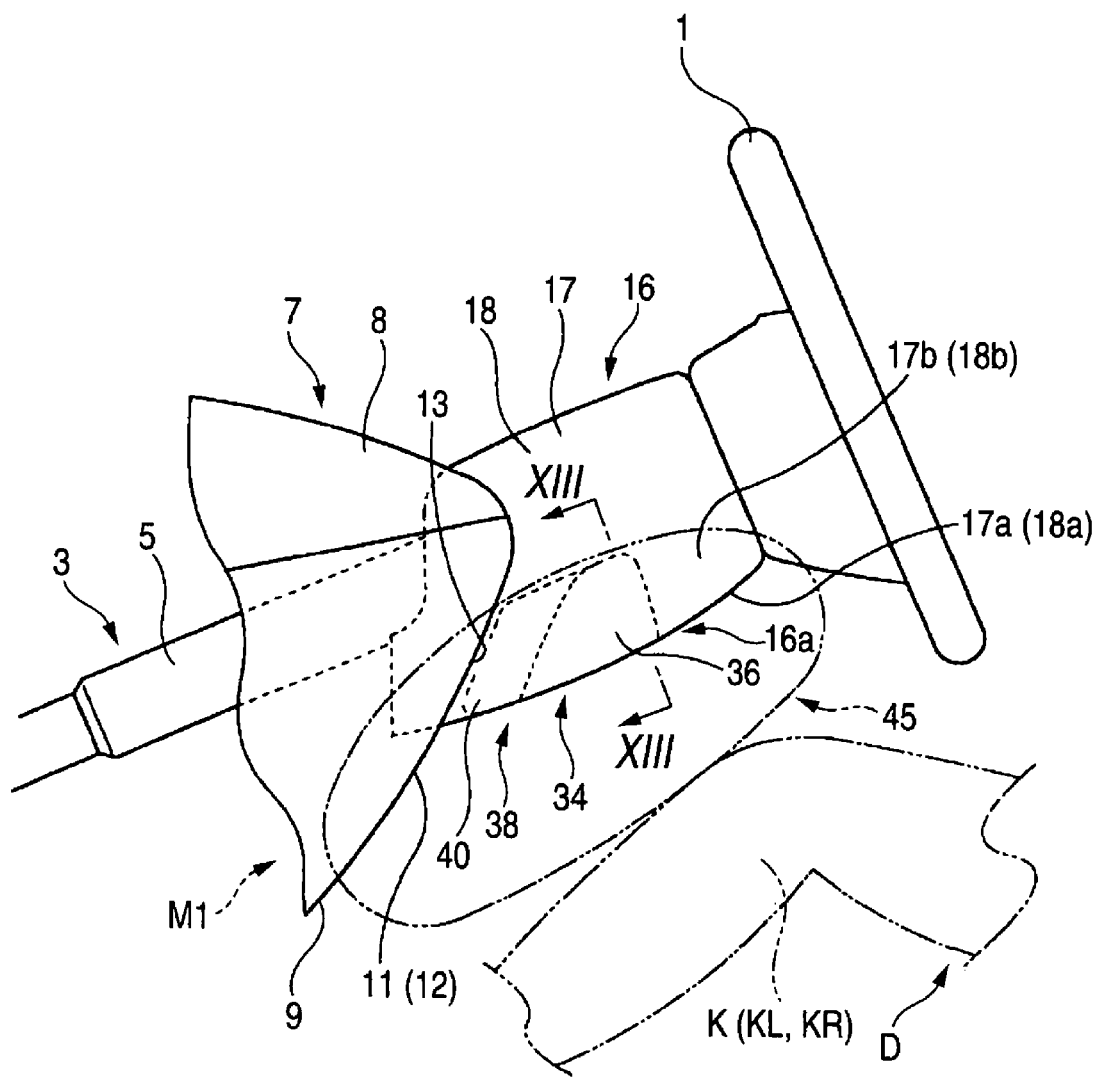
FIG. 1 is a an outline side view of a vicinity of a column cover mounted with a knee protecting air bag apparatus of an embodiment according to the invention.
Figure 2:
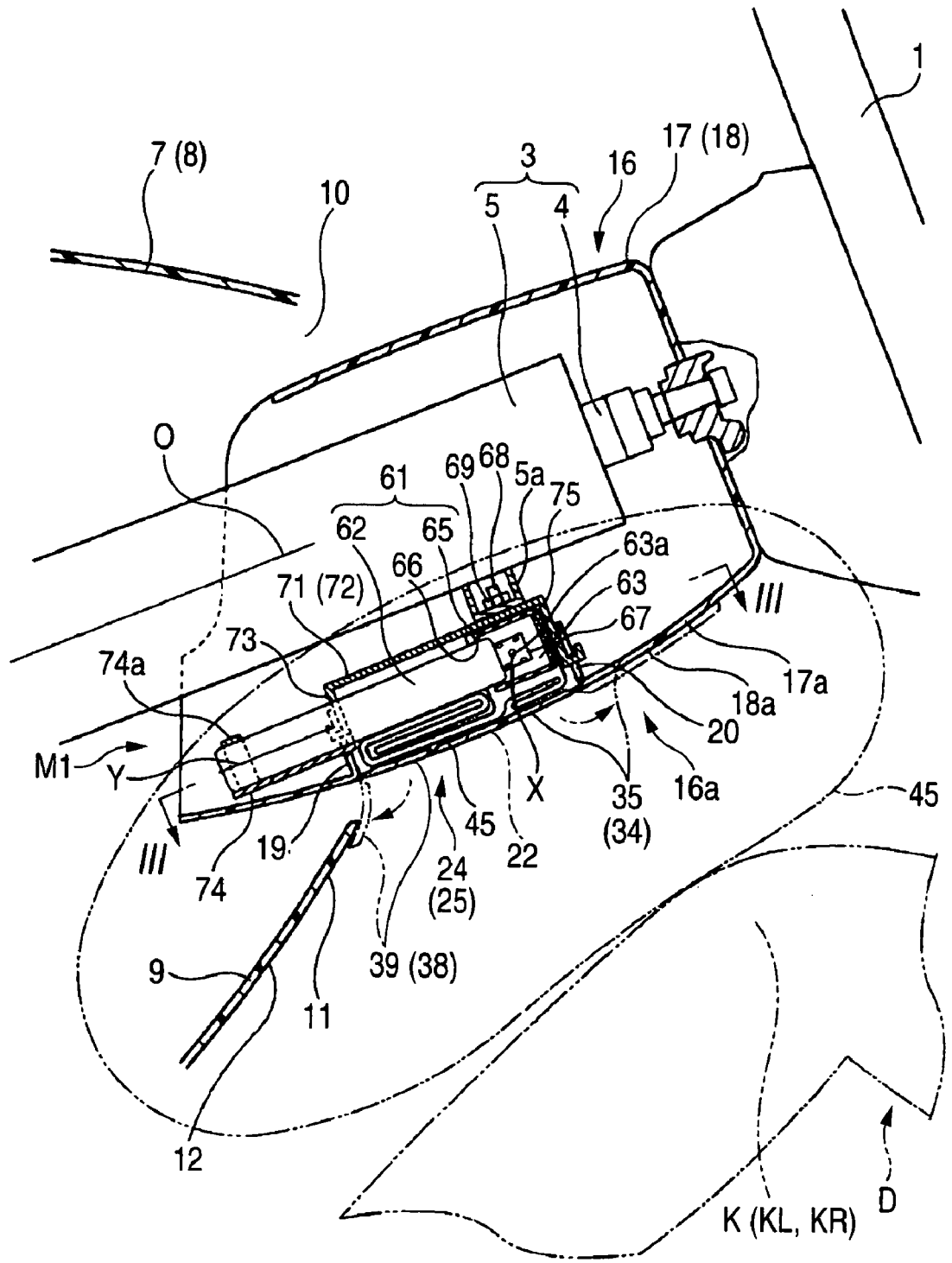
FIG. 2 is an outline enlarged vertical sectional view along a front and rear direction of the vicinity of the column cover mounted with the knee protecting air bag apparatus of the embodiment.
Figure 3:
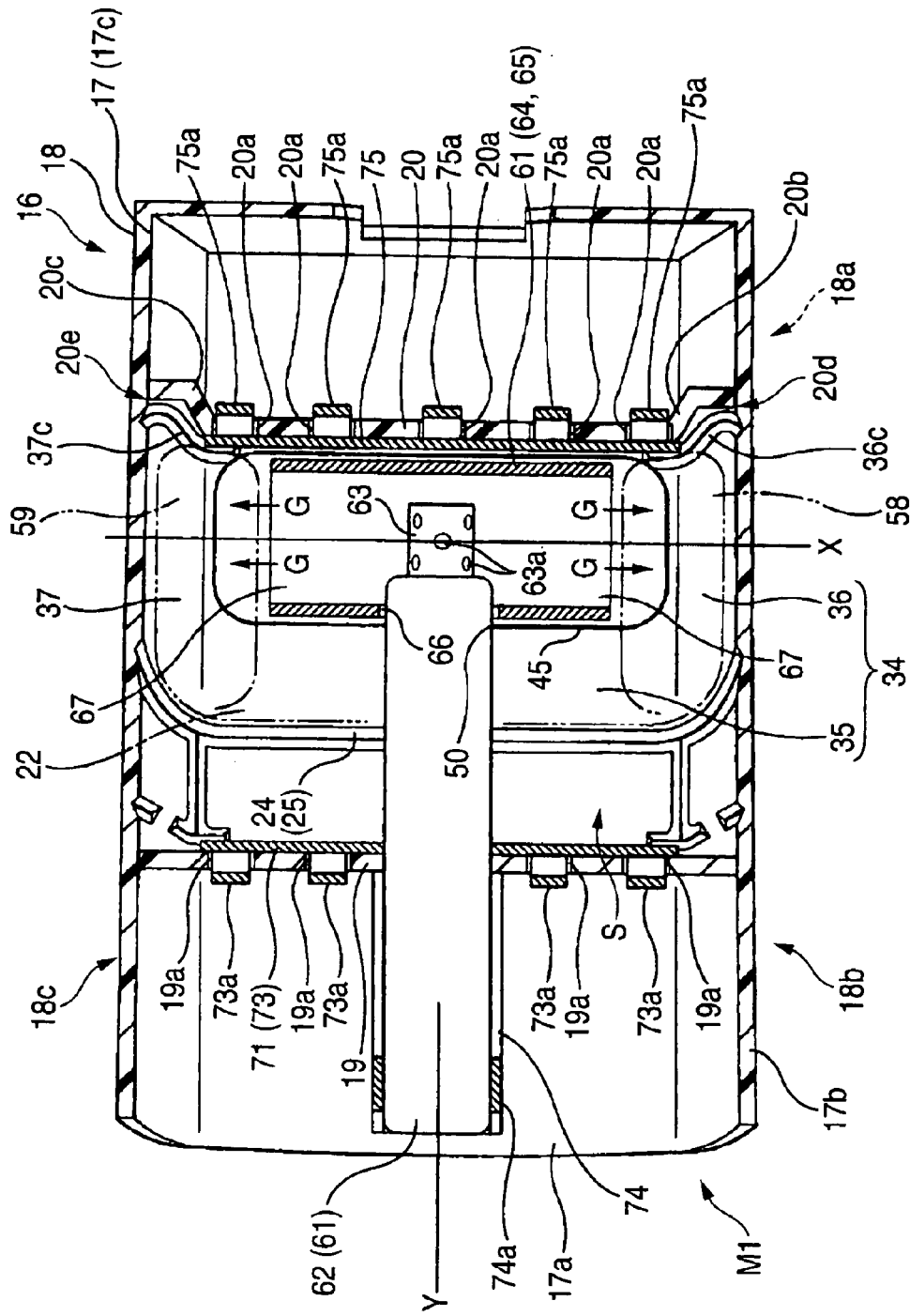
FIG. 3 is an outline enlarged horizontal sectional view of the vicinity of the column cover mounted with the knee protecting air bag apparatus according to the embodiment corresponding to a III-III portion of FIG. 2.

Further, as shown in FIGS. 2, 3, and 5, inside of the column cover 16 is formed with side walls 19, 20 two left and right edges of which are connected to the left side wall 17b and the right side wall 17c and which are extended to the upper side from the lower wall 17a at front and rear edges of an area forming the projecting opening 22. The side walls 19, 20 partition to rectify a containing space S of the folded air bag 45 at inside of the column cover 16. Further, the side walls 19, 20 also serve as walls for attaching the case 71 mentioned later, and formed with pluralities of locking holes 19a, 20a for inserting respective locking pieces 73a, 75a of the case 71 to lock a peripheral edge thereof by the locking pieces 73a, 75a.

Further, the containing space S of the folded air bag 45 at inside of the column cover 16 is set by surrounding two left and right sides by the left door portion 36, the right door portion 37, the auxiliary left door portion 40, and the auxiliary right door portion 41, and surrounding two front and rear sides by the side walls 19, 20, surrounding the upper side by the case 71, and surrounding the lower side by the lower door portion 35 and the auxiliary lower door portion 39.

Figure 7:
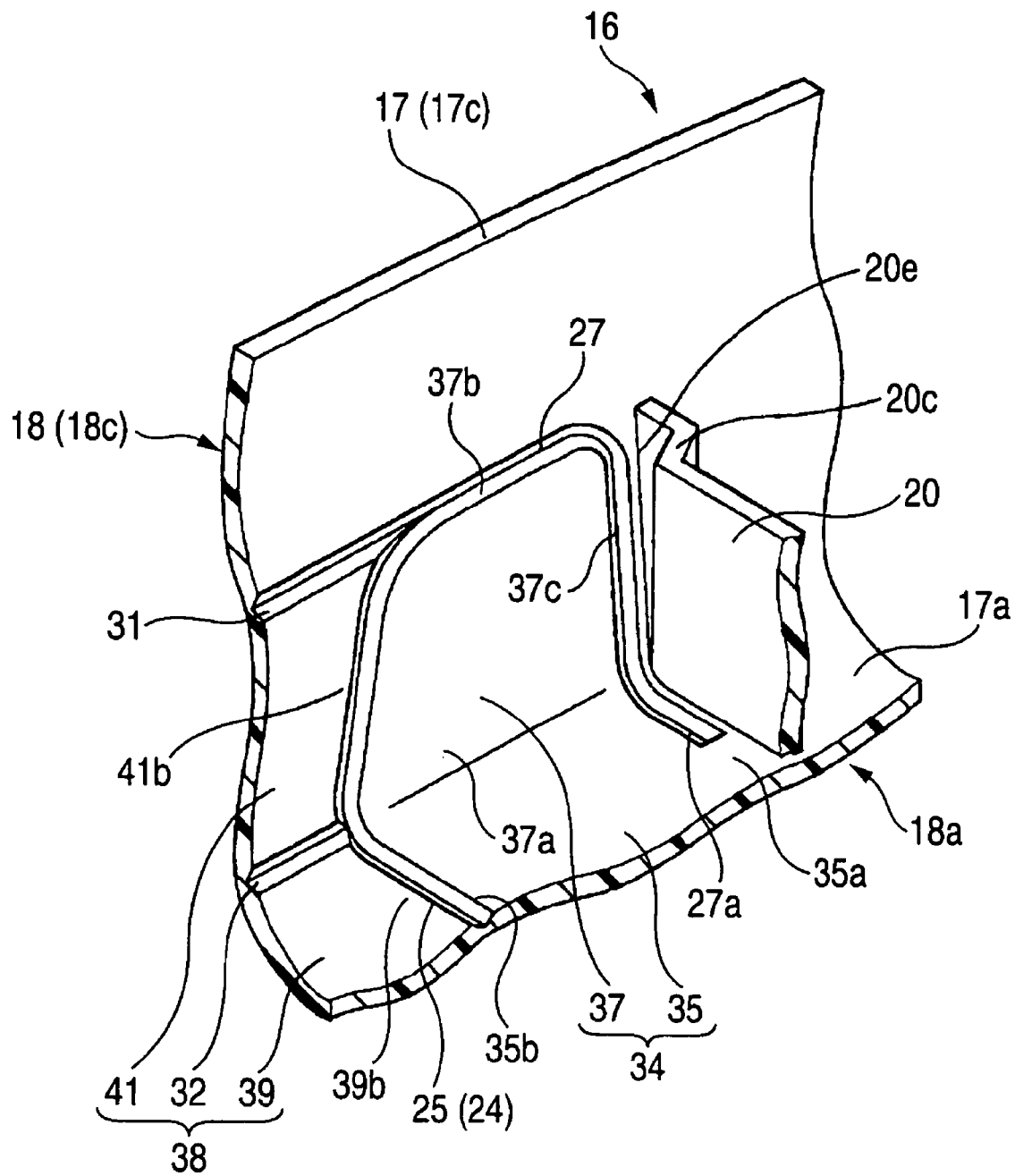
FIG. 7 is a partially enlarged perspective view of the column cover used in the knee protecting air bag apparatus of the embodiment.

Further, in the case of the embodiment, as shown by FIGS. 3, 5, 7, vicinities of two left and right ends of the side wall 20 on the rear side are bent to the lower side by providing bent portions 20b, 20c bent to the rear side to enlarge the containing space S. Further, the left door portion 36 and the right door portion 37 are arranged such that sides of rear edges 36c, 37c of outer peripheral edges thereof are respectively made to be proximate to a left edge 20d and a right edge 20e on left and right sides of the side wall 20 which are bent to be arranged to enlarge the area of the door portions.

Figure 8:
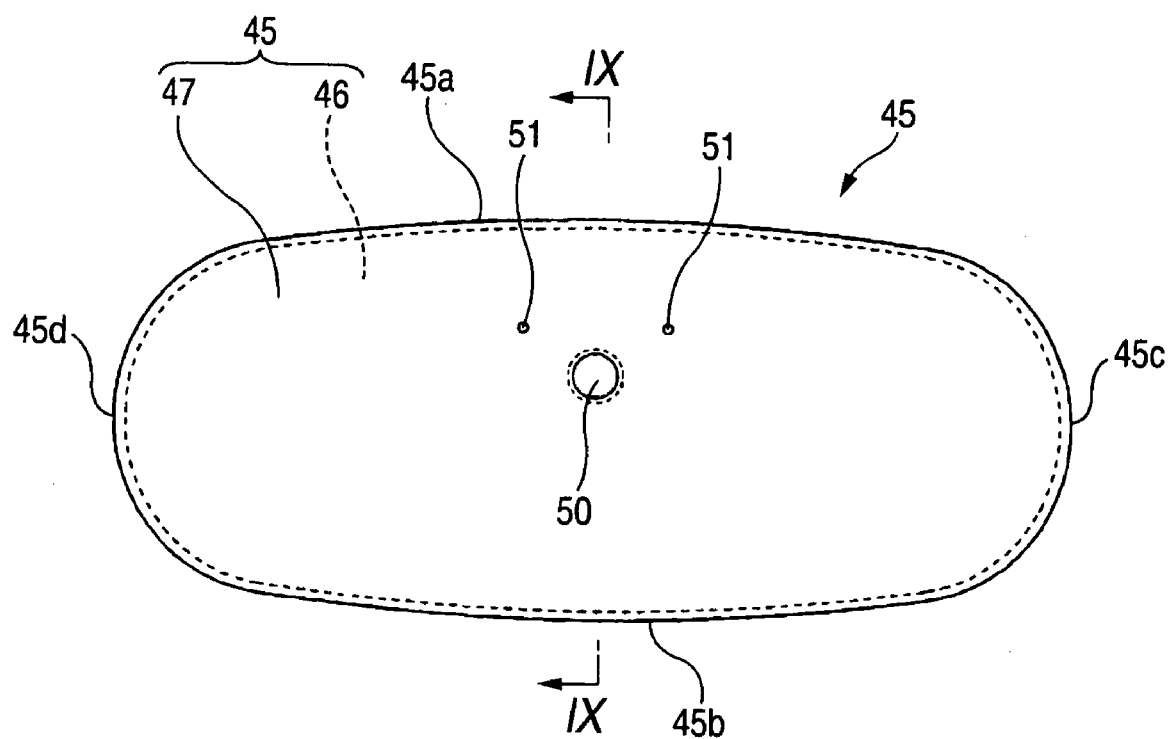
FIG. 8 is a front view of an air bag used in the knee protecting air bag apparatus of the embodiment.
Figure 9:
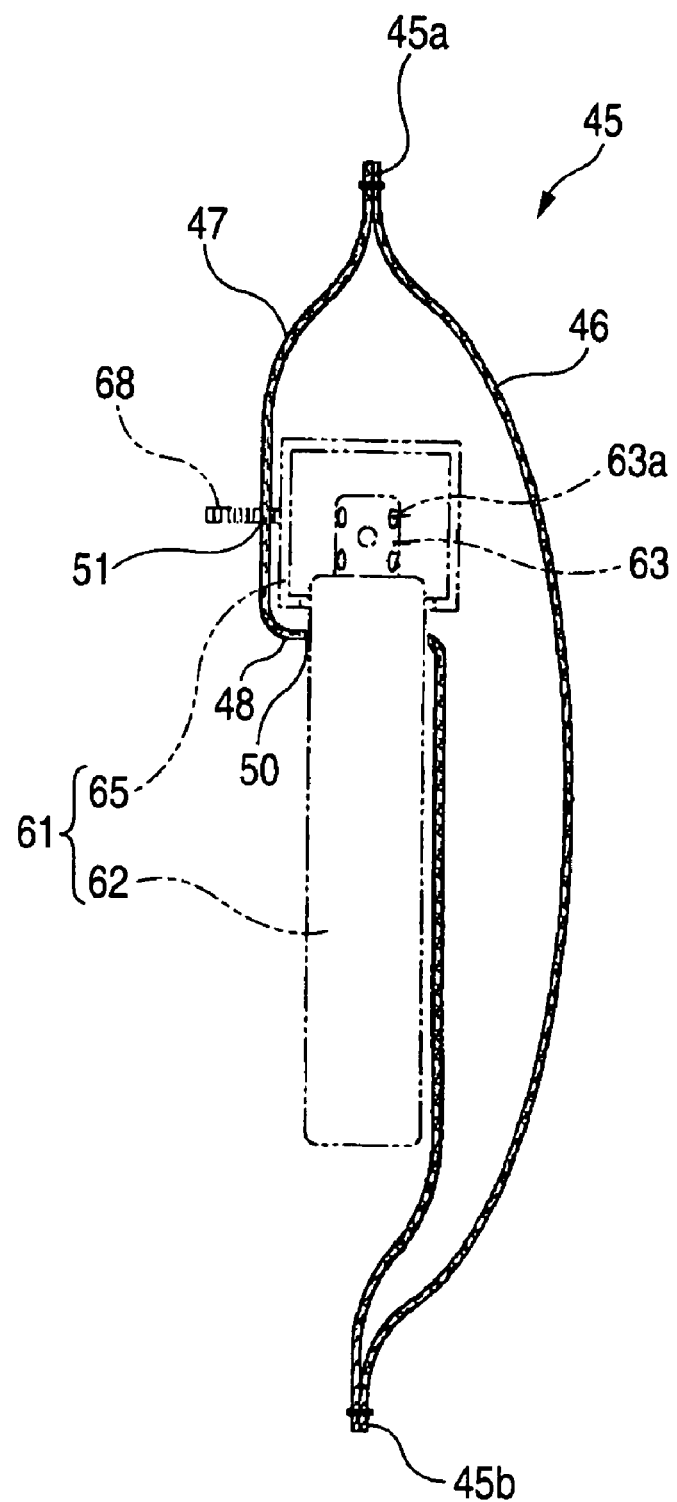
FIG. 9 is a vertical sectional view showing a state of integrating the inflator at the air bag used in the knee protecting air bag apparatus of the embodiment, corresponding to a IX-IX portion of FIG. 8.

As shown by FIGS. 8, 9, 16, the air bag 45 is constituted such that a shape thereof finished to be expanded is constituted by substantially a laterally prolonged rectangular plate shape prolonged in the left and right direction and is constituted by including a driver side wall portion 46 arranged on the side of the driver D when finished to be expanded, and a column side wall portion 47 arranged on a side of the column cover 16. The driver side wall portion 46 and the column side wall portion 47 form the air bag 45 by cutting the same shape of the outer shape from woven cloth of polyester, polyamide or the like and sewing together at the peripheral edges thereof. Further, as shown by FIG. 8, the column side wall portion 47 is formed with an insertion hole 50 opened in a circular shape for inserting a rear end side of the inflator 61 at a vicinity of the center in a left and right direction on a side of an upper edge 45a (which may constitute a rear edge side after having been expanded in a vehicle mounting state) of the air bag 45 and formed with attaching holes 51 for projecting respective bolts 68 (refer to FIG. 4) of the inflator 61 on two left and right sides of the insertion hole 50.

Further, when the air bag 45 is finished to expand to develop, the air bag 45 is constituted by a shape capable of covering a side of the lower face 18a of the column cover 16 projected from the inpane 7 to the rear side, and sides of the rear faces 12, 13, 14 on the lower side and the two left and right sides of the column cover 16 for constituting the lower edge side peripheral edge 11 of the containing opening 10 of the inpane 7 (refer to FIG. 16).

Further, the air bag 45 may be formed by folding one sheet of a cloth member connected with the driver side wall portion 46 and the column side wall portion 47 at a portion of a peripheral edge thereof in two and sewing an outer peripheral edge thereof.

Further, inside of the air bag 45 is arranged with a tether, not illustrated, for restricting a thickness by connecting the driver side wall portion 46 and the column side wall portion 47 to be able to maintain the plate shape after having been finished to expand.

Figure 4:
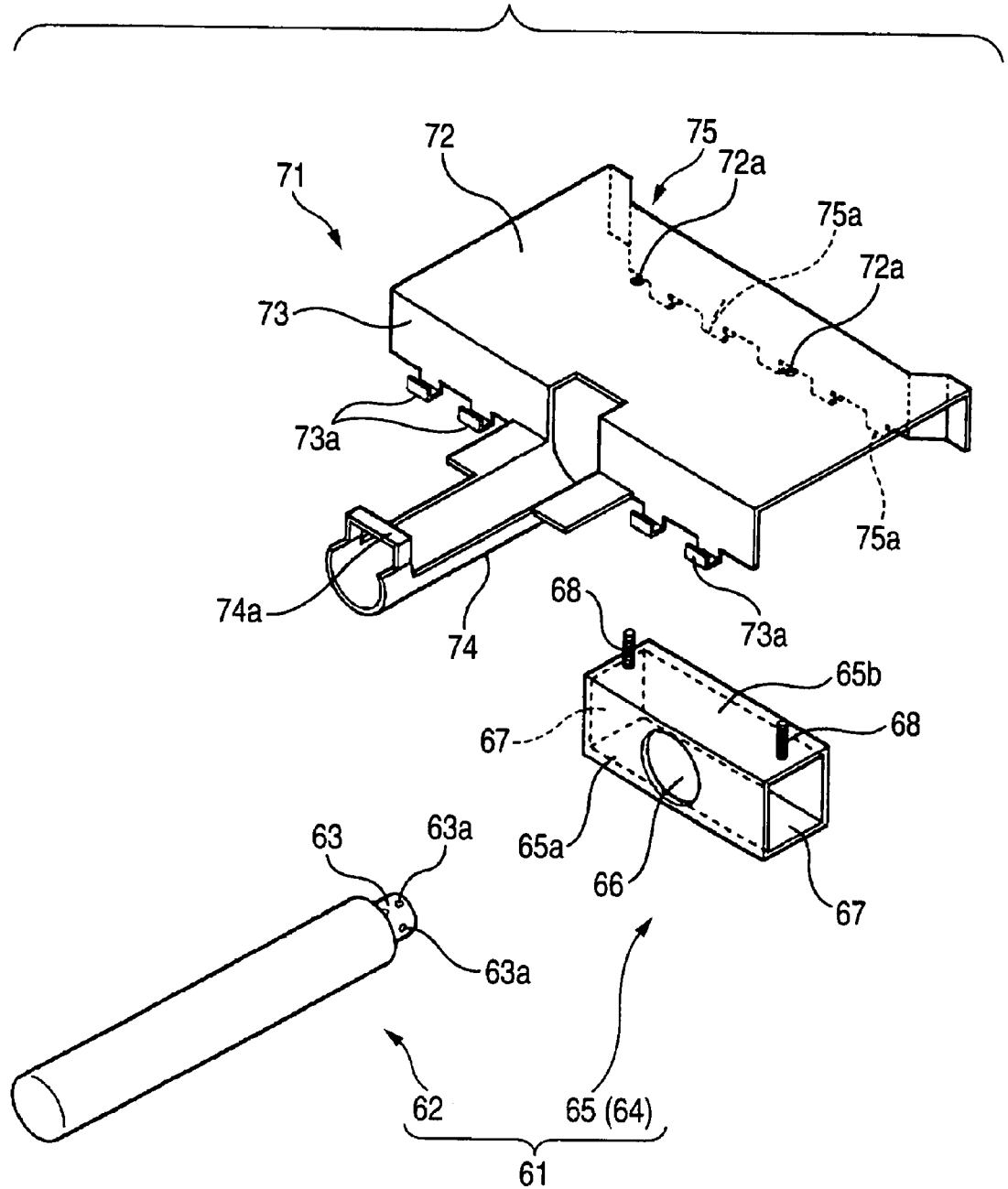
FIG. 4 is a disassembled perspective view of a case and an inflator used in the knee protecting air bag apparatus of the embodiment.
Figure 11A:
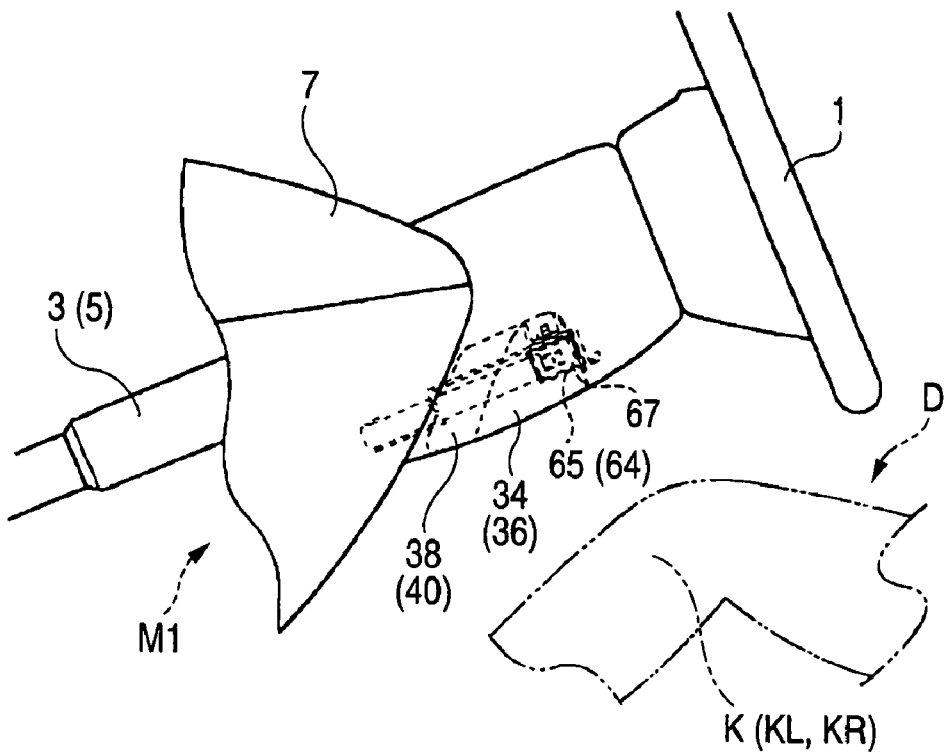
FIG. 11 illustrates side views successively showing an occasion of operating the knee protecting air bag apparatus of the embodiment.
Figure 11B:
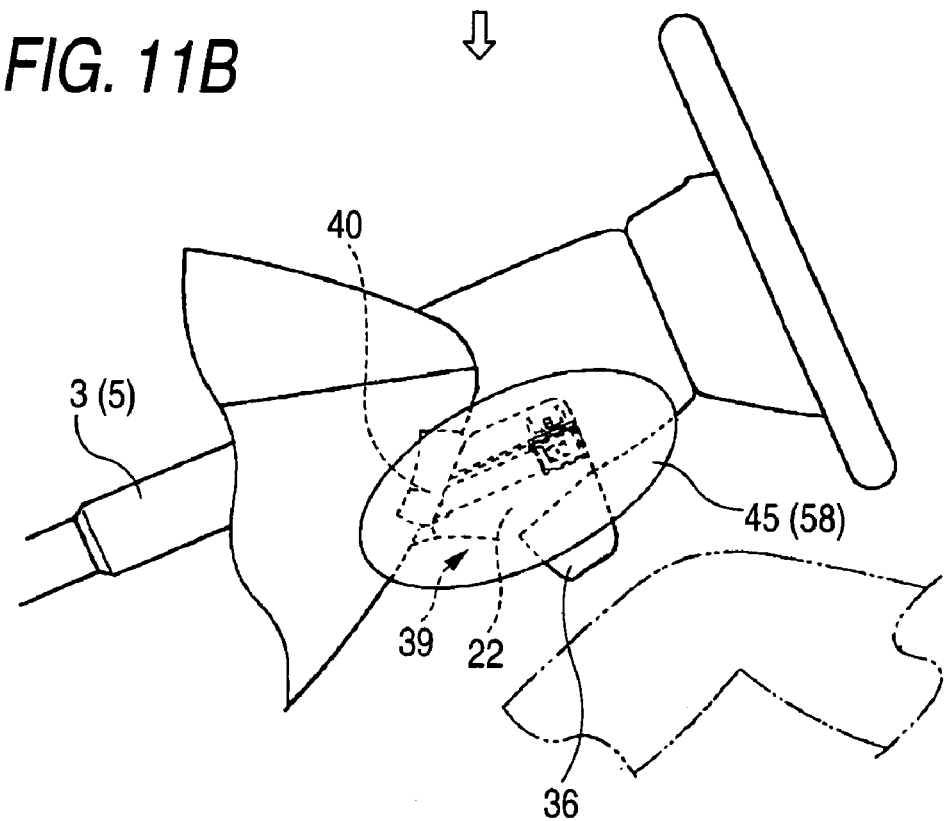
Figure 13A:
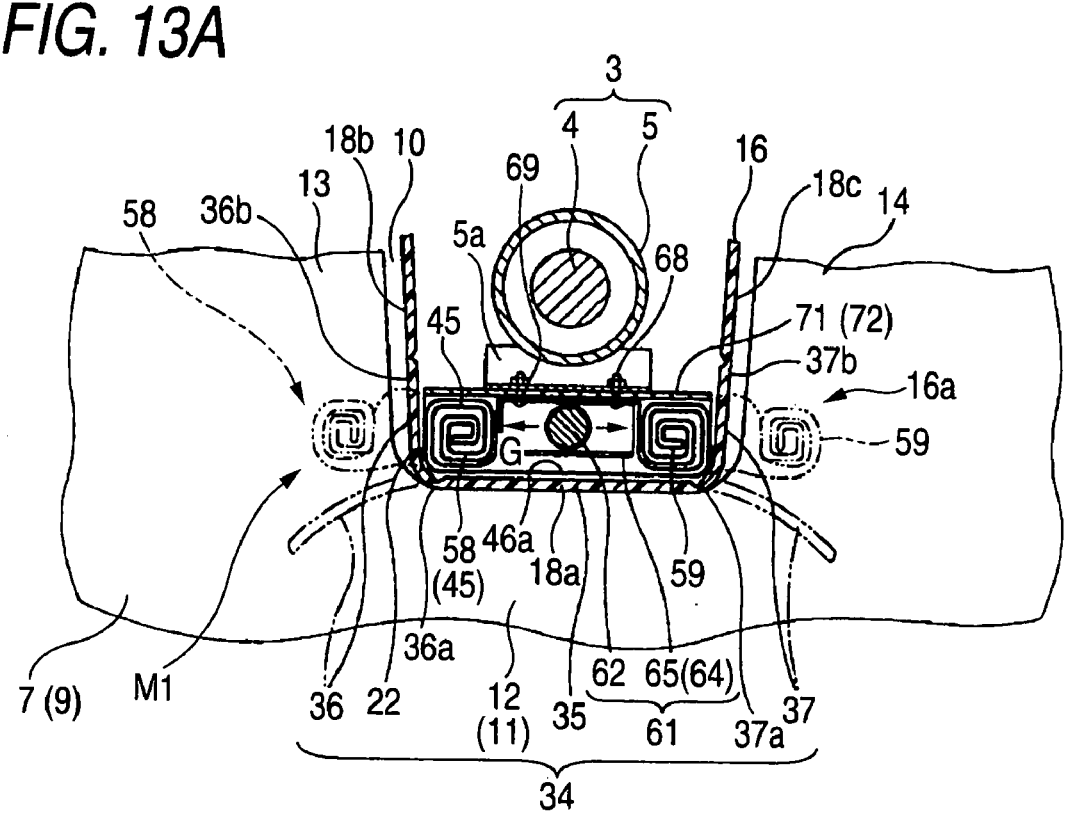
FIG. 13 illustrates outline vertical sectional views along substantially a left and right direction successively showing the occasion of operating the knee protecting air bag apparatus of the embodiment, corresponding to a XIII-XIII portion of FIG. 1.

As shown by FIGS. 2 through 4, the inflator 61 includes a main body 62 having a gas injection port 63a for injecting an expanding gas and a diffuser 65 connected to the main body 62 for restricting a flow out direction of the expanding gas injected from the gas injection port 63a. The main body 62 is formed by a rod-like shape in a shape of a circular cylinder having a head portion 63 in a shape of a circular cylinder provided with a plurality of the gas injection ports 63a at an outer peripheral face thereof. The diffuser 65 constitutes a gas flow restricting member 64 for making the expanding gas at inside of the air bag 45 flow to the left door portion 36 and the right door portion 37 arranged at the left side face 18b and the right side face 18c on two left and right sides of the column cover 16 of the door portion 34 by constituting outer directions from a vicinity of a center in a left and right direction of the column cover 16 to both left and right sides. Further, in the case of the embodiment, the diffuser 65 is made of a sheet metal and formed by a shape of a square cylinder an axial direction of which is arranged in the left and right direction and constituted such that a vicinity of a center in the left and right direction of a front wall 65a is formed with an integrating hole 66 opened in a circular shape for inserting the side of the end portion 63 of the main body 62, and openings at two left and right ends thereof are constituted by flow out ports 67, 67 for making the expanding gas flow to the left door portion 36 and the right door portion 37. Further, a ceiling wall 65b of the diffuser 65 is aligned with two pieces of bolts 68 projected to the upper side along the left and right direction. The respective bolts 68 are fastened to brackets 5a of the column tube 5 by nuts 69. Further, in a case of the embodiment, as shown by FIG. 11A and FIG. 13A, the diffuser 65 in being mounted to the vehicle is arranged such that an axial direction X connecting the left and right flow out ports 67, 67 of the diffuser 65 is along a horizontal direction in the left and right direction, and the flow out port 67 is partially or totally overlapped to the left door portion 36 and the right door portion 37 in a state of being projected in the left and right direction. Incidentally, in the case of the embodiment, entire regions of the flow out ports 67 are overlapped to the left door portion 36 and the right door portion 37.

As shown by FIGS. 2 through 4, the case 71 is made by a sheet metal a section of which is constituted by an inverse U-like shape, and constituted by including a ceiling wall 72 and side walls 73, 75 extended from front and rear edges of the ceiling wall 72, and the respective side walls 73, 75 are formed with pluralities of locking pieces 73a, 75a having a section in a J-like shape connected to the side walls 19, 20 by being inserted to respective locking holes 19a, 20a provided at the side walls 19, 20 of the column cover 16. The ceiling wall 72 is formed with through holes 72a for penetrating the respective bolts 68 of the inflator 61.

Further, the side wall 73 on the front side of the case 71 is formed with an attaching seat 74 separated at a vicinity of a center in the left and right direction for fixing the main body 62 of the inflator 61 to the case 71. The attaching seat 74 is provided with a clamp portion 74a constituted by substantially a shape of a half split circular cylinder for containing the main body 62 by inserting the side of the head portion 63 between the side walls 73, 75 for fixing the main body 62 to the attaching seat 74 by being plastically deformed to be brought into press contact with the outer peripheral face of the main body 62 by contracting a diameter thereof.

Figure 10A:
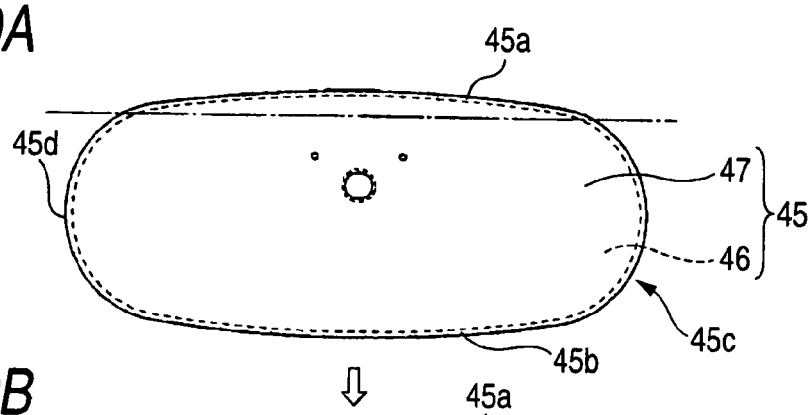
FIG. 10 illustrates views for explaining steps of folding the air bag used in the knee protecting air bag apparatus of the embodiment.
Figure 10B:
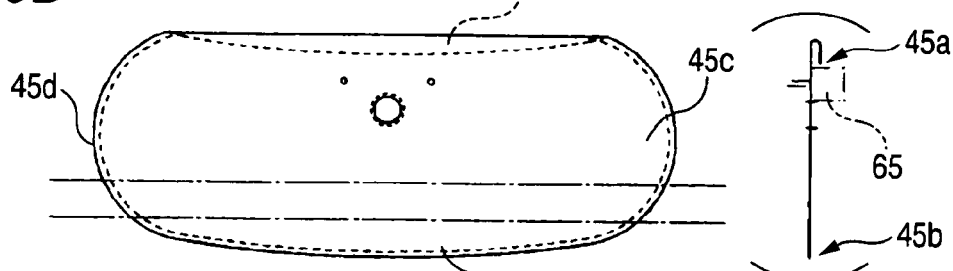
Figure 10C:
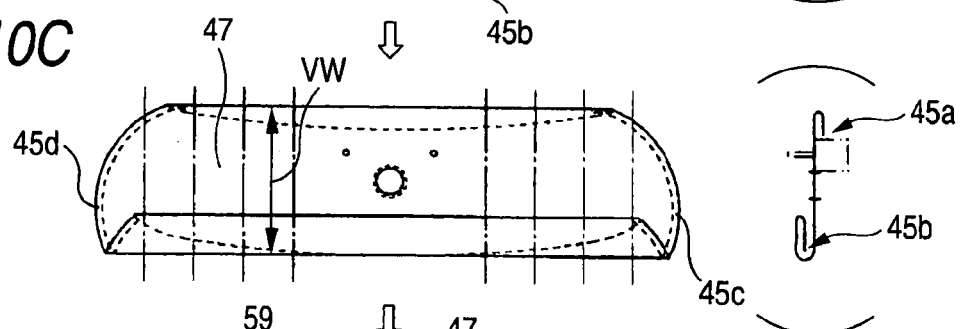
Figure 10D:
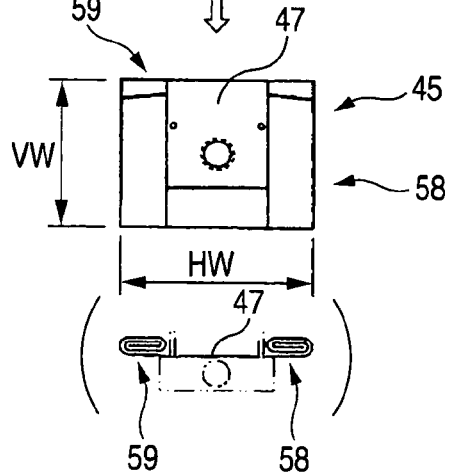

Explaining an operation of mounting the knee protecting air bag apparatus M1 of the embodiment to the vehicle, first, the air bag 45 is folded. In the folding, in the case of the embodiment, as shown by FIGS. 10(A) through (C), the column side wall portion 47 is disposed on the driver side wall portion 46 to be developed to be flat, sides of an upper edge 45a and a lower edge 45b are folded to be proximate to the center side in the front and rear direction and folded to narrow a width dimension VW in the front and rear direction. Further, the folding is carried out by containing the diffuser 65 at inside of the air bag 45 previously in a state of projecting the bolt 68 from the attaching hole 51. In the operation of containing the diffuser 65 to inside of the air bag 45, in the midst of fabricating the air bag 45, the diffuser 65 is arranged at inside of the air bag 45 and the outer peripheral edges of the driver side wall portion 46 and the column side wall portion 47 are sewn.

Further, as shown by FIGS. 10C, D, the air bag 45 is folded such that a left edge 45c and a right edge 45d are made to be proximate to the center side to narrow the width direction in the left and right direction of the air bag 45. In the case of the embodiment, the left edge 45c and the right edge 45d are folded by being folded in rolls on the side of the column side wall portion 45. Folded portions 58, 59 on left and right sides on the side of the left edge 45c and the side of the right edge 45d are arranged to close the flow out ports 67, 67 of the diffuser 65 to be opposed to the flow of the expanding gas flowing out from the diffuser 65 at the left door portion 36 and the right door portion 37 of the door portion 34 at inside of the column cover 16 when contained (refer to FIG. 13A).

When the air bag 45 has been finished to be folded, the air bag 45 is wrapped by a predetermined wrapping member for preventing the folding from being crumbled so as not to be crumbled. Successively, by penetrating the bolt 68 of the diffuser 65 through the through hole 72a, the folded air bag 45 is contained between the side walls 73, 75 of the case 71 on the lower face side of the ceiling wall 72. Further, the main body 62 of the inflator 61 is arranged on the upper face side of the attaching seat 74, the side of the head portion 63 is fitted to be inserted into the through hole 50 of the air bag 45, further, inserted into the integrating hole 66 of the diffuser 65, the clamp portion 74a is plastically deformed to contract the diameter, the inflator 61 is formed by integrating the main body 62 to the diffuser 65 and the inflator 61 is fixed to the case 71.

Further, the air bag assembly integrated in this way is attached to be fixed to the bracket 5a of the column tube 5 of the steering column 3 by fastening the respective bolts 68 by the nuts 69, a lead wire, not illustrated, extended from an air bag operating circuit is wired to the main body 62 of the inflator 61, and the column cover 16 is attached to the steering column 3, then, the knee protecting air bag apparatus M1 can be mounted to the vehicle.

Figure 12A:
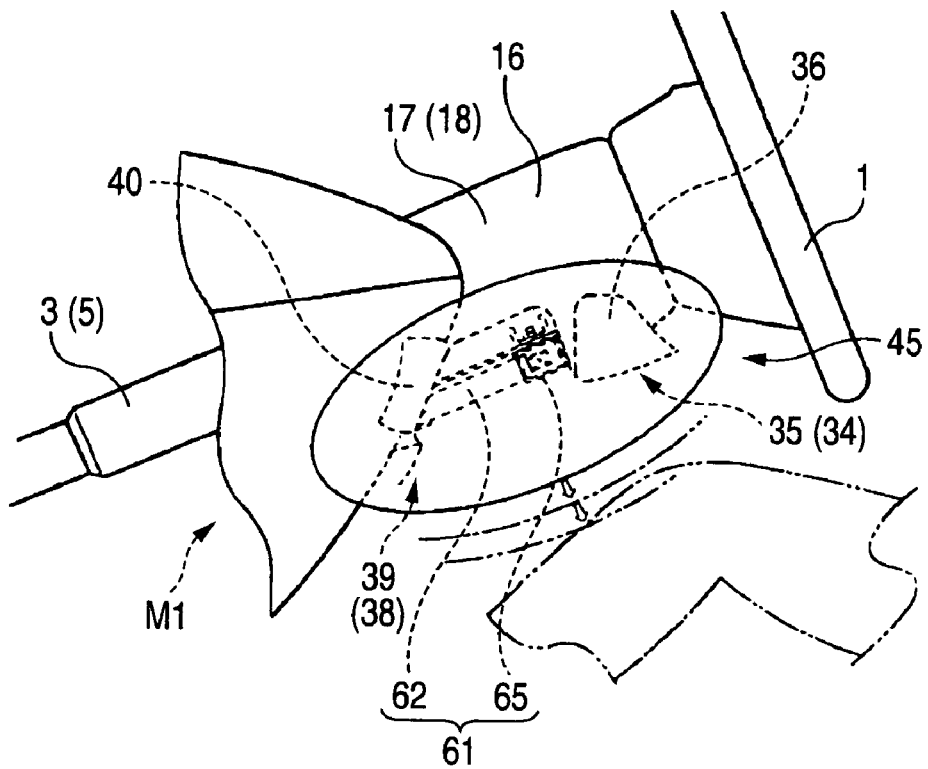
FIG. 12 illustrates side views successively showing the occasion of operating the knee protecting air bag apparatus of the embodiment, showing a state after FIG. 11.
Figure 12B:
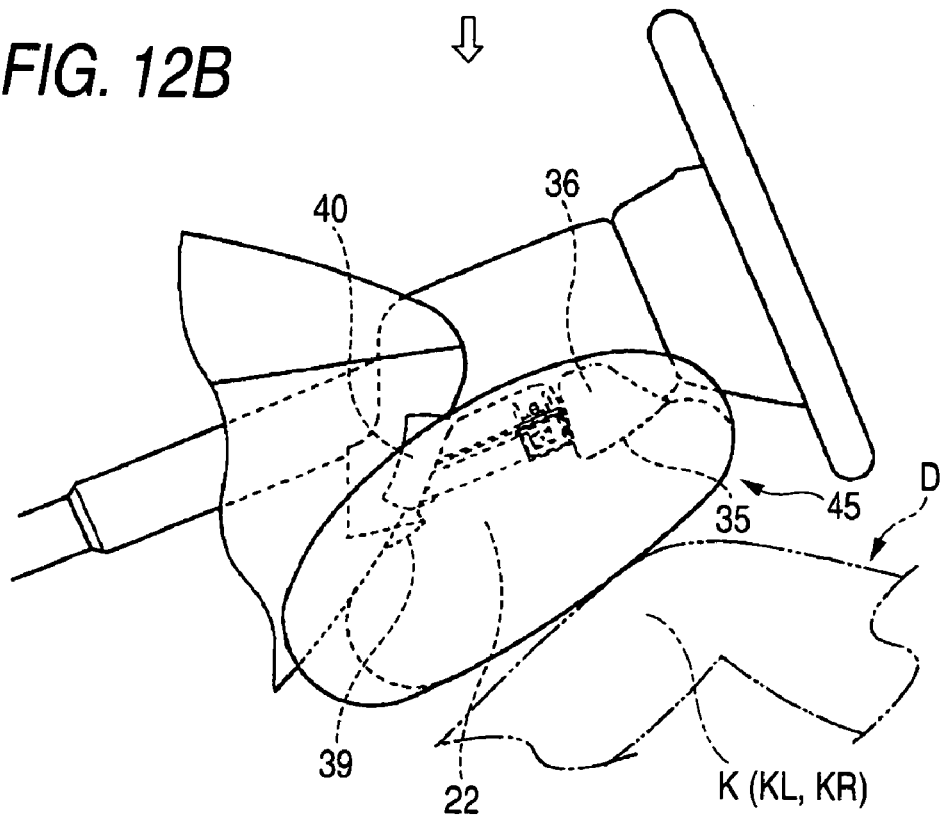

After having been mounted to the vehicle, when the knee protecting air bag apparatus M1 of the embodiment is operated, the main body 62 of the inflator 61 injects the expanding gas G from the gas injection port 63a, and the expanding gas G is supplied to the air bag 45 from the flow out ports 67, 67 on the two left and right sides of the diffuser 65. Further, when the expanding gas G is supplied to the air bag 45, as shown by FIGS. 11A, B, FIGS. 13A, B, FIGS. 15A, B, at inside of the air bag 45, by the diffuser 65 constituting the gas flow restricting member 64, the expanding gas G is going to flow to outer directions of the two left and right sides from the vicinity of the center in the left and right direction of the column cover 16 to the left door portion 36 and the right door portion 37 of the door portion 34. Therefore, according to the air bag 45 folded to be contained at inside of the column cover 16, the folded portions 58, 59 pressed to the two left and right sides by the expanding gas G flowing in the outer directions press to open the left door portion 36 and the right door portion 37 and projected from the column cover 16 in the outer directions of the two left and right sides. Further, in the case of the embodiment, also the auxiliary left door portion 40 and the auxiliary right door portion 41 are pressed to be widened. Thereafter, as shown by FIGS. 12A, B, FIGS. 14A, B, or FIGS. 16A, B, the air bag 45 is further supplied with the expanding gas G directed to the both sides in the left and right direction and developed widely in the width direction on the two left and right sides, presses to open the lower door portion 35 and the door portion 34 and the auxiliary lower door portion 39 and is bulged to increase the thickness to finish expansion as shown by FIGS. 12, 14, 16B and FIG. 17. Further, although the lower door portion 35 and the auxiliary lower door portion 39 at positions on the side of the lower face 18a of the column cover 16 at the door portion 34 may be opened substantially simultaneously with the right door portion 37 and the auxiliary left door portion 40, the auxiliary right door portion 41, the air bag 45 per se carries out a behavior of being expanded to develop widely in the width direction on the two left and right sides by the expanding gas G directed to the both sides in the left and right direction and bulged to the rear side (driver D side, lower side).

Therefore, according to the knee protecting air bag apparatus M1 of the embodiment, the air bag 45 projected from the column cover 16 is expanded to develop widely in the width direction in the left and right direction at an initial stage of expansion and is expanded to increase the thickness, and therefore, even when the column cover 16 is proximate to the both knees KL, KR of the seated driver D, the air bag 45 can be smoothly expanded to be arranged on the front side of the both knees KL, KR of the driver D.

Further, in the case of the embodiment, the inflator 61 for supplying the expanding gas G is constituted by the main body 62 having the gas injection port 63*a* for injecting the expanding gas G and the diffuser 65 made of a sheet metal connected to the main body 62 for restricting the flow out direction of the expanding gas G injected from the gas injection port 63*a*, and the gas flow restricting member 64 is constituted by the diffuser 65. That is, the gas flow restricting member 64 is formed from the diffuser having a rigidity, and therefore, the flow out direction of the expanding gas G can be stabilized from start of operating the knee protecting air bag apparatus M.

Further, when the point is not taken into consideration, the gas flow restricting member may be constituted by a flow rectifying cloth arranged at inside of the air bag 45 to be able to be folded integrally with the air bag 45.

Further, according to the embodiment, the main body 62 of the inflator 61 is formed in the rod-like shape having the head portion 63 provided with the gas injection port 63*a* at the front end, the diffuser 65 is formed in the cylindrical shape arranging the axial direction in the left and right direction, the integrating hole 66 at the vicinity of the center in the left and right direction of the diffuser 65 is inserted with the side of the head portion 63 of the main body 62, and the openings at the two left and right ends are constituted as the flow out ports 67, 67 for making the expanding gas G to inside of the air bag 45 flow to the positions of the left side face 18*b* and the right side face 18*c* of the column cover 16. Therefore, the main body 62 of the inflator 61 is constituted by the rod-like member of the cylinder type including the head portion 63 provided with the gas injection port 63*a* at a front end thereof in an axial direction Y (refer to FIG. 3), the axial direction Y can be arranged in a direction orthogonal to the axial direction X of the diffuser 65 in the cylindrical shape, that is, a front and rear direction or an up and down direction orthogonal to the left and right direction, a space of arranging the main body 62 of the inflator 61 in the left and right direction at inside of the column cover 16 can be narrowed, which is preferable for mounting the knee protecting air bag apparatus M1 to inside of the column cover 16 narrowing the space in the left and right direction.

Figure 13B:
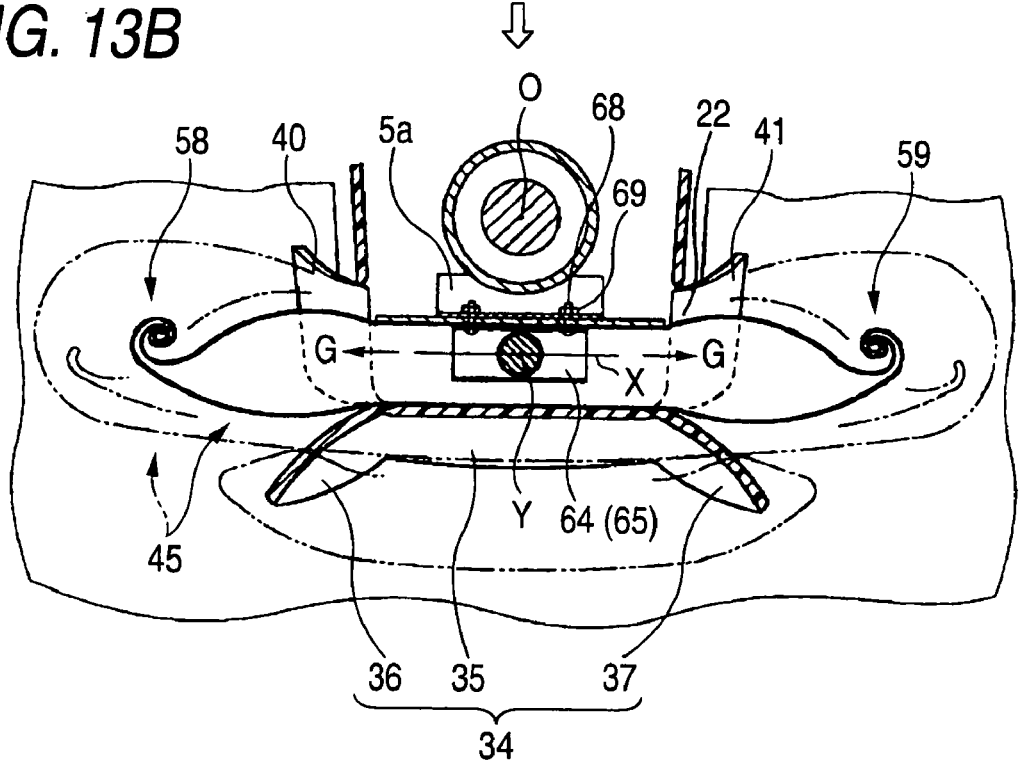

Further, in the case of the embodiment, the inflator 61 is arranged by arranging the main body 62 on the lower side of the column tube 5 of the steering column 3 by making the main body 62 in line with a vertical face of the steering column 3 along the axial direction O (refer to FIG. 2, FIG. 13B). Therefore, the inflator 61 can be arranged at a vicinity of the center in the left and right direction of the column cover 16 by avoiding the inflator 61 from being projected to left or right side from right below the column tube 5 of the steering column 3 as less as possible, and the knee protecting air bag apparatus M1 can easily be mounted to the column cover 16 without widening the width dimension in the left and right direction of the column cover 16.

Furthermore, according to the embodiment, the diffuser 65 is constituted by constituting the direction of the expanding gas G flowing to the two left and right sides as left and right directions constituting directions inverse to each other as the horizontal direction. Therefore, the diffuser 65 can be formed from a straight tube capable of arranging the axial direction X in the left and right direction, and therefore, fabrication of the diffuser 65 is facilitated without being bent in a V-like shape or the like.

Further, when the above-described point is not taken into consideration, the diffuser may be constituted in a shape of a V-like tube by directing the left and right flow out ports 67, 67 from a vicinity of the center in the left and right direction of the diffuser 65 in a skewed upper direction or a skewed upper rear direction, or a skewed upper front direction or the like. Incidentally, when the directions of the left and right flow out ports 67, 67 are constituted by the skewed upper direction (skewed upper front direction) (refer to an arrow mark of a two-dotted chain line of FIG. 14B) to direct to sides of the left and right rear faces 13, 14 of the inpane 7 (lower panel 9) at the surrounding of the column cover 16, the air bag 45 can further be developed in the left and right direction along the rear faces 13, 14 of the inpane 7 by restraining the air bag 45 from being projected to the side of the driver D.

Further, according to the embodiment, the left door portion 36 and the right door portion 37 of the door portion 34 is constituted by the lower opening type of opening the sides of the upper edges 36*b*, 37*b* to the lower side. Therefore, when the left door portion 36 and the right door portion 37 are opened, in comparison with the sides of the upper edges 36*b*, 37*b*, opening on the lower edge sides constituting the sides of the hinge portions 36*a*, 37*a* is retarded, and therefore, the air bag 40 projected from the left side face 18*b* and the right side face 18*c* in the left and right direction of the column cover 16 to the two left and right sides is brought into a state of being restrained from being projected to the lower side, and the air bag 45 is further promoted to expand to develop widely in the left and right direction at an initial stage of expansion.

Further, when the point is not taken into consideration, the left door portion 36 and the right door portion 37 of the door portion 34 may be constituted by a front opening type of opening the rear edge sides to the front side, or a rear opening type of opening the front edge side to the rear side, further, an upper opening type of opening the lower edge side to the upper side as in the auxiliary left door portion 40 and the auxiliary right door portion 41.

Further, according to the embodiment, the containing space S of the air bag 45 folded at inside of the column cover 16 is formed by surrounding the two left and right sides by the left door portion 36, the right door portion 37 of the door portion 34, the auxiliary left door portion 40 and the auxiliary right door portion 41, surrounding the two front and rear sides the side walls 19, 20 extended from the lower wall 17*a* of the column cover 16 to the upper side, the side wall 20 on one side is arranged such that the two left and right ends are bent to rear side of enlarging containing space S, further, by making the sides of the rear ends 36*c*, 37*c* of the outer peripheral edges of the left door portion 36 and the right door portion 37 proximate to the left edge 20*d* and the right edge 20*e* of the side wall 20 respectively arranged to bend to widen the area of the door portion 34 (refer to FIGS. 3, 5, 7). That is, in a cross-sectional face of the column cover 16, the sides of the rear edges 36*c*, 37*c* of the outer peripheral edges of the left door portion 36 and the right door portion 37 are corresponded to be proximate to the left edge 20*d* and the right edge 20*e* of the bent side wall 20, areas of the left door portion 36 and the right door portion 37 of the door portion 34 can be made to be as large as possible, the air bag 45 projected in left and right directions can be projected from the left side face 18*b* and the right side face 18*c* in the left and right direction of the widely opened column cover 16, and the air bag 45 can further smoothly be expanded to develop in the left and the right direction at an initial stage of expansion.

Further, although according to the embodiment, the bent portions 20b, 20c are provided at the side wall 20 on the rear side, in correspondence with the door portion 34, the bent portion may be provided at the side wall 19 on the front side, or the bent portions may be provided at both of the side walls 19, 20.

Furthermore, according to the embodiment, the air bag 45 is constituted by including the driver side wall portion 46 arranged on the side of the driver D when expansion has been finished and the column side wall portion 47 arranged on the side of the column cover 16, in containing the air bag 45, the air bag 45 is constituted to be contained at inside of the column 16 by folding the air bag 45 such that the both edges of the left edge 45c and the right edge 45d in the left and right direction are proximate to the center side as foldings of narrowing the width dimension in the left and right direction from the state of overlapping to develop the driver side wall portion 46 and the column side wall portion 47. Further, the folded portions 58, 59 on the side of the left edge 45c and the side of the right edge 45d of the air bag 45 are arranged to close the flow out ports 67, 67 to be opposed to the flow of the expanding gas G flowing out from the diffuser 65 constituting the gas flow restricting member 64 at positions of the left door portion 36 and the right door portion 37 of the door portion 34 at inside of the column cover 16 when the air bag 45 is contained. Therefore, when the expanding gas G flows in outer directions on the both left and right sides, the folded portions 58, 59 on the side of the left edge 45c and on the side of the right edge 45d of the air bag 45 are pressed in the outer directions on the both left and right sides by the expanding gas G to press to open the left door portion 36 and the right door portion 37 of the door portion 34, further, the auxiliary left door portion 40 and the auxiliary right door portion 41. That is, as shown by FIGS. 11A, B, FIGS. 13A, B, FIGS. 15A, B, the left and right folded portions 58, 59 of the air bag 45 are pressed by the expanding gas G to project to the both left and right sides of the column cover 16 while pressing to open the left door portion 36 and the right door portion 37 of the door portion 34, further, the auxiliary left door portion 40 and the auxiliary right door portion 41, further, in a state of being jumped to a free space from the column cover 16, the expanding gas G in the outer directions on the both left and right sides flows, and the air bag 45 can further smoothly be expanded to develop widely in the left and right direction at an initial stage of expansion.

Further, in this case, according to the embodiment, the folded portions 58, 59 on the side of the left edge 45c and on the side of the right edge 45d of the air bag 45 are formed by folding the both left and right edges of the left edge 45c and the right edge 45d by rolling in rolls of being rolled to a side of the column side wall portion 47, and therefore, when the folding is released, the folded portions 58, 59 can be developed in the left and right direction along the rear faces 13, 14 of the inpane 7 on the left and right sides of the column cover 16, and the air bag 45 can further smoothly be expanded to develop widely in the left and right direction without being proximate to the side of the driver D.

Further, although according to the embodiment, there is shown a case of arranging the auxiliary door portion 38 on the front side of the door portion 34 to widen the opening area of the projecting opening 22, so far as the opening area of the projecting opening 22 can sufficiently be ensured, the auxiliary door portion 38 may be omitted.

Further, although according to the embodiment, the lower door portion 35 of the door portion 34 is constituted by the rear opening type of opening the side of the front edge 35b to the rear side, the lower door portion 35 may be constituted by a front opening type of opening the rear edge side to the front side. In this case, the left door portions 36, 37 may be connected by providing the hinge portions 36a, 37a at the left and right edges. Or when the lower door portion 35 is constituted by the front opening type, the left door portion 36 and the right door portion 37 in the left and right direction may be constituted by an upper opening, or a front opening or rear opening type. Further, the left door portion 36 and the right door portion 37 may be constituted such that the lower door portion 35 is divided into two in the left and right direction and respectively connected to the left door portion 36 and the right door portion 37.

Further, when the two edges of the left edge 45c and the right edge 45d are folded by being folded in rolls on the side of the column side wall portion 47 to be proximate to the center side to be contained at inside of the column cover 16 as foldings of the air bag 45 of narrowing the width dimension in the left and right direction from the state of overlapping to develop the driver side wall portion 46 and the column side wall portion 47 as in the embodiment, the side of the left edge 45c and the side of the right edge 45d in the left and right direction of the air bag 45 are arranged to be shifted from right below the inflator 61 to the both left and right sides, the folded portions 58, 59 are not arranged right below the diffuser 65 of the inflator 61, and only the center portion 46a (refer to FIG. 13) in the left and right direction of the driver side wall portion 46 is arranged. In such a constitution, at an initial stage of making the expanding gas G flows thereinto, unless the folded portions 58, 59 are projected from the column cover 16 in left and right directions and the rolls of the folded portions 58, 59 are released to some degree, the center portion 46a cannot be moved in the lower direction. Therefore, the driver side wall portion 46 is restrained from being projected to the lower side constituting the side of driver D at the vicinity of the center portion 46a, and a behavior of the air bag 45 of expanding the left and right knees KL, KR at the vicinity of the center portion 46a is restrained.

Figure 18:
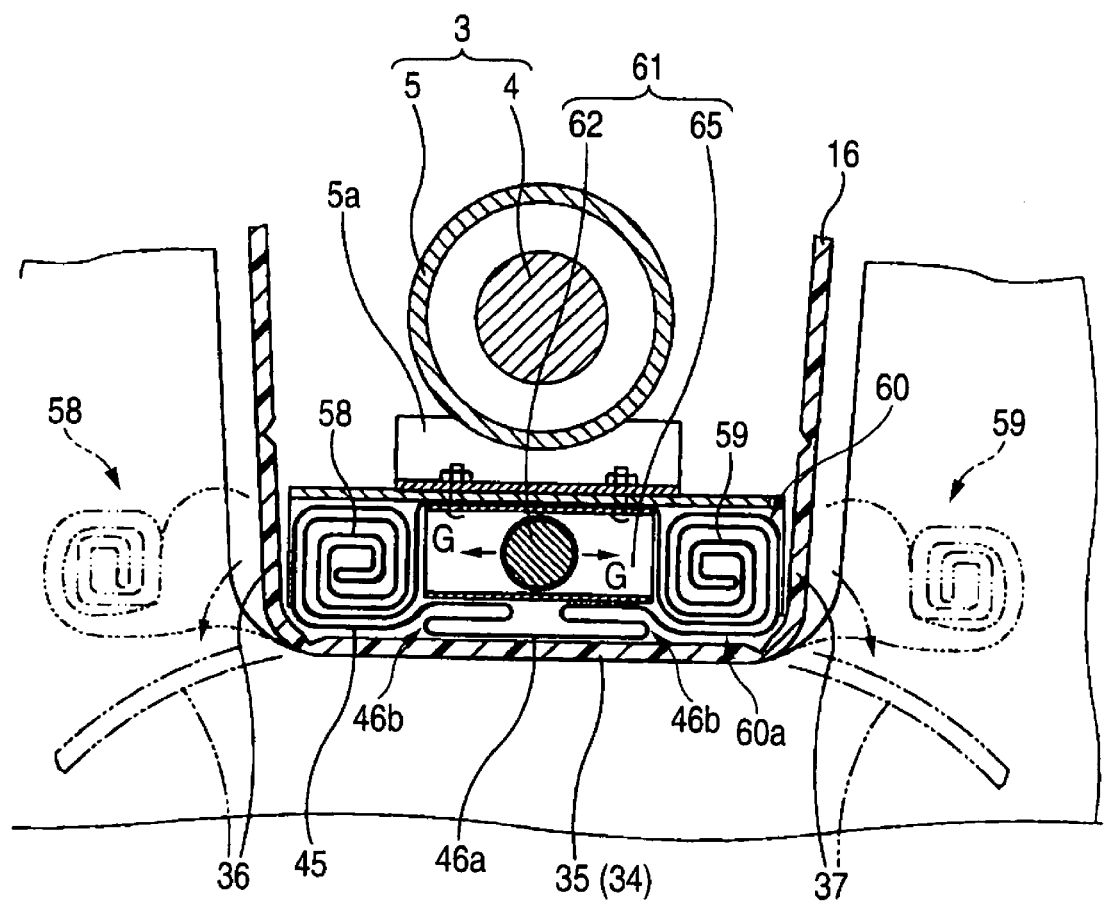
FIG. 18 is an outline vertical sectional view along substantially a left and right direction showing a modified example of an occasion of containing an air bag of the knee protecting air bag apparatus of the embodiment.

Further, as shown by FIG. 18, the state of developing the air bag 45 is easy to be ensured so far as the vicinity of the center portion 46a is brought into a state of being exposed to the side of the lower face 60a of the fold finish member 60 when the air bag 45 has been finished to be folded, even when a tack 46b is provided at the surrounding.

Furthermore, according to the constitution in which the folded portions 58, 59 on the side of the left edge 45c and on the side of the right edge 45d in the left and right direction of the air bag 45 are arranged to be shifted from right below the inflator 61 to the both left and right sides, the folded portions 58, 59 are not arranged but only the center portion 46a in the left and right direction of the driver side wall portion 46 is arranged right below the diffuser 65 of the inflator 61, even when there is constructed a constitution in which the expanding gas G flows out to the side of the lower door portion 35 in the lower direction, a behavior of the air bag 45 of invading between the knees KL, KR of widening the left and right knees KL, KR by the vicinity of the center portion 46a can be restricted. Because at the initial stage of making the expanding gas G flows thereinto, the center portion 46a cannot be moved to the lower side unless the folded portions 58, 59 are projected from the column cover 16 in left and right directions and the rolls of the folded portions 58, 59 are released to some degree.

Figure 19:
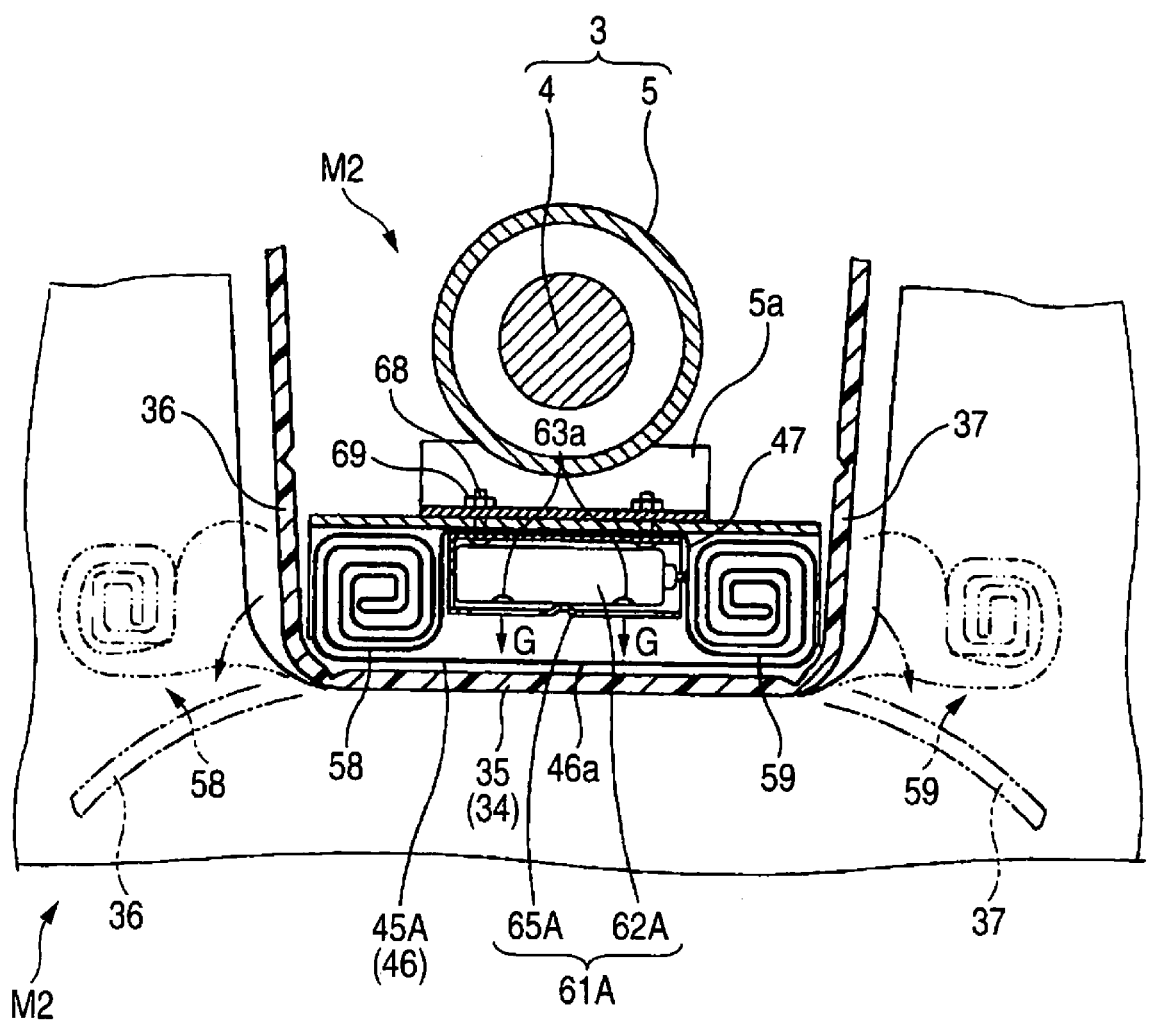
FIG. 19 is an outline vertical sectional view along substantially a left and right direction showing an initial stage of operating a knee protecting air bag apparatus of a reference example.
Figure 20A:
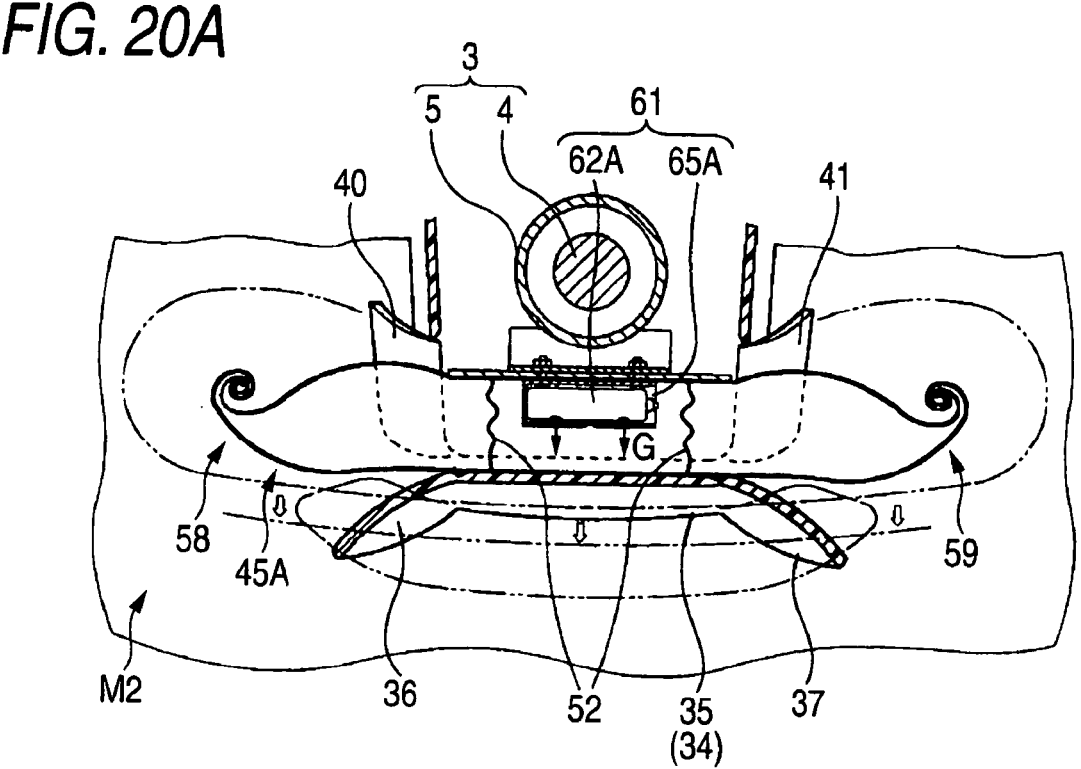
FIG. 20 illustrates outline vertical sectional views showing an occasion of operating the knee protecting air bag apparatus of the reference example, showing a state after FIG. 19.
Figure 20B:
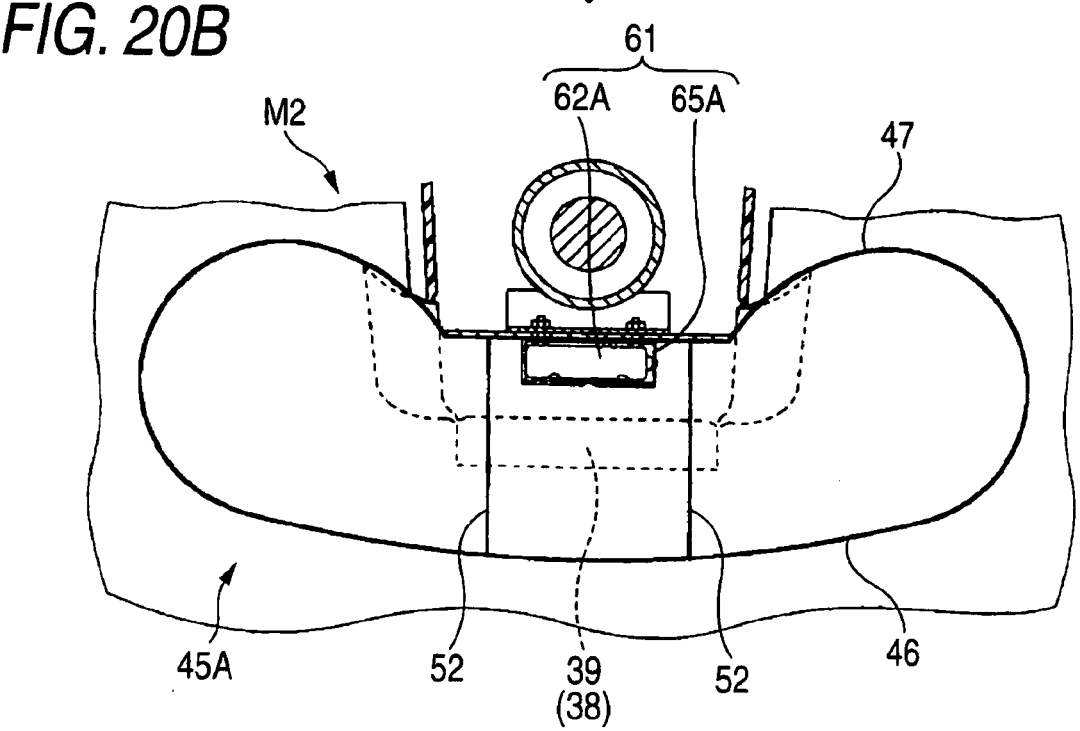

That is, an inflator 61A for injecting the expanding gas G from an inflator 61A in a lower direction may be used as in a knee protecting air bag apparatus M2 shown in FIGS. 19, 20. According to the inflator 61A, a main body 62A of a cylinder type is provided with the plurality of gas injection ports 63a for injecting the expanding gas G in the lower direction and is pinched by a diffuser 65A in a half split circular cylinder shape capable of making the expanding gas G flow out in the lower direction. Further, the knee protecting air bag apparatus M2 is made to be similar to the knee protecting air bag apparatus M1 in other constitution except that a constitution of the inflator 61A differs from that of the knee protecting air bag apparatus M1.

Also according to the knee protecting air bag apparatus M2, when operated, although the expanding gas G is not directed to the both sides in the left and right direction but flows to the lower side, the center portion 46a cannot be moved in the lower direction unless the folded portions 58, 59 are projected from the column cover 16 in left and right directions and the rolls of the folded portions 58, 59 are released to some degree, as a result, the air bag 45A is expanded to develop in left and right directions at the initial stage of expansion, projected in outer directions of the both left and right sides from the column cover 16, thereafter, the air bag 45A is further supplied with the expanding gas G to develop widely in the width on the both left and right sides to bulge to increase the thickness. Further, according to the knee protecting air bag apparatus M2, the lower door portion 35 of the door portion 34 is opened substantially simultaneously with the left door portion 36 and the right door portion 37 of the door portion 34.

Further, the air bag 45A is arranged with a tether 52 for restricting a distance of separating the driver side wall portion 46 and the column side wall portion 47 at a vicinity of the inflator 61A and a shape thereof after having been expanded is constituted by a rectangular plate shape extended in the left and right direction.

Further, according to the embodiment, the lower door portion 35, the left door portion 36, the right door portion 37 of the door portion 34 and the auxiliary lower door portion 39, the auxiliary left door portion 40, the auxiliary right door portion 41 of the auxiliary door portion 38 are constituted to form the projecting opening 22 by breaking the breakage scheduled portion 24 when opened by breaking the breakage scheduled portion 24 capable of being broken by being pressed by the air bag 45 at respective surroundings thereof, and therefore, partitions of the surroundings of the respective door portions can be prevented from being revealed on the side of the outer surface of the column cover 16, and an outlook design of the column cover 16 can be improved. Naturally, when the point is not taken into consideration, the breakage scheduled portion 24 may be arranged to be opened by being pressed by the air bag 45 when expanded previously as a constitution separated from the surroundings. Further, there may be constructed a constitution in which a peripheral edge of the opening of the projecting opening 22 of the column cover 16 is formed with an opening for attachment, and the peripheral edge of the opening is integrated with a member for door portion provided with the door portion 34 and the auxiliary door portion 38 (for example, an air bag cover separating from the column cover 16).

What is claimed is:

1. A knee protecting air bag apparatus that is mounted to a lower portion side of a column cover for covering a steering column, in which a folded air bag is contained on the lower portion side at inside of the column cover, when the knee protecting air bag apparatus is operated, the air bag is supplied with an expanding gas, and the air bag is projected from the column cover to be arranged on a front side of the knee of a driver while being expanded to develop, wherein the column cover includes a door portion formed at an area from the lower face side over to both left and right side faces of the column cover and to be opened by being pressed by the air bag so as to form a projecting opening for projecting the air bag when the air bag is expanded; and a gas flow restricting member is arranged at inside of the air bag so as to outwardly expand the air bag in a left and right direction of the column cover by making the expanding gas at inside of the air bag flow from a vicinity of a center in the left and right direction to portions of the two left and right side faces of the column cover at the door portion, wherein a space for containing the air bag folded at inside of the column cover is formed by surrounding both left and right sides thereof by the portions of the both left and right side faces of the column cover at the door portion, and surrounding both front and rear sides thereof by side walls extended in an upper direction from a lower wall of the column cover, the side walls being located inside the column cover;

wherein at least one of the side walls on the both front and rear sides is arranged by bending both left and right ends to one side in the front and rear direction of expanding the containing space; and wherein an outer peripheral edges of the portions of the both left and right side faces of the column cover at the door portion are arranged to be proximate to both left and right edges of the side walls respectively bent to be arranged to widen an area of the door portion.

2. The knee protecting air bag apparatus according to claim 1, further comprising an inflator for supplying the expanding gas, wherein:

the inflator includes a main body having a gas injection port for injecting the expanding gas, and a diffuser connected to the main body for restricting a flow out direction of the expanding gas injected from the gas injection port; and the gas flow restricting member is constituted by the diffuser.

3. The knee protecting air bag apparatus according to claim 2, wherein the main body is formed in a shape of a rod having a head portion provided with the gas injection port at a front end thereof;

wherein the diffuser is formed in a shape of a cylinder in an axial direction of which is arranged in the left and right direction, a side of the head portion of the main body is inserted to a vicinity of a center in the left and right direction, and openings at both left and right ends thereof are constituted as flow out ports for making the expanding gas at inside of the airbag flow to the portions of the both left and right side faces of the column cover.

4. The knee protecting air bag apparatus according to claim 3, wherein the inflator is arranged such that the main body is provided at a lower side of the steering column along a vertical face along an axial direction of the steering; column.

5. The knee protecting air bag apparatus according to claim 2, wherein directions of the expanding gas made to flow to the both left and right sides are left and right directions constituting directions reverse to each other as a horizontal direction.

6. A knee protecting air bag apparatus that is mounted to a lower portion side of a column cover for covering a steering column, in which a folded air bag is contained on the lower portion side at an inside of the column cover, when the knee protecting air bag apparatus is operated, the air bag is supplied with an expanding gas from an inflator, and the air bag is projected from the column cover to be arranged on a front side of the knee of a driver while being expanded to develop, wherein the column cover includes a door portion formed at an area from the lower face side over to both left and right side faces of the column cover and to be opened by being pressed by the air bag so as to form a projecting opening for projecting the air bag when the air bag is expanded, a gas flow restricting member is arranged at inside of the air bag so as to outwardly expand the air bag in a left and right direction of the column cover by making the expanding gas at inside of the air bag flow from a vicinity of a center in the left and right direction to portions of the both left and right side faces of the column cover at the door portion; and wherein the inflator includes a main body having a gas injection port for injecting the expanding gas, and a diffuser connected to the main body and formed in a shape of a cylinder in an axial direction being arranged in the left and right direction the diffuser restricting a flow direction of the expanding gas injected from the gas injection port; and wherein the main body is formed in a shape of a rod having a head portion provided with the gas injection port at a front end thereof, the main body being provided at a lower side of the steering column such that an axial direction of the main body is along an axial direction of the steering column;

the diffuser comprises openings provided at both left and right ends thereof constituted as flow out ports for making the expanding gas from the head portion of the main body flow toward the portions of the both left and right side faces of the column cover, the gas flow restricting member being constituted by the diffuser, wherein the air bag includes a driver side wall portion arranged on a side of the driver when the air bag has been finished to expand and a column side wall portion arranged on a side of the column cover, when the air bag is contained, as a constitution of containing the air bag at inside of the column cover by folding both left and right edges thereof to be proximate to a center side as foldings of narrowing a width dimension in the left and right direction from a state of overlapping to expand the driver side wall portion and the column side wall portion, portions of folding the both left and right edges of the air bag are arranged to be opposed to a flow of the expanding gas flowing out from the diffuser at the portions of the both left and right side faces of the column cover at the door portion at inside of the column cover so as to close the flow out ports of the diffuser when the air bag is contained.

7. A knee protecting air bag apparatus that is mounted to a lower portion side of a column cover for covering a steering column, in which a folded air bag is contained on the lower portion side at an inside of the column cover, when the knee protecting air bag apparatus is operated, the air bag is supplied with an expanding gas from an inflator, and the air bag is projected from the column cover to be arranged on a front side of the knee of a driver while being expanded to develop, wherein the column cover includes a door portion formed at an area from the lower face side over to both left and right side faces of the column cover and to be opened by being pressed by the air bag so as to form a projecting opening for projecting the air bag when the air bag is expanded;

a gas flow restricting member is arranged at inside of the air bag so as to outwardly expand the air bag in a left and right direction of the column cover by making the expanding gas at inside of the air bag flow from a vicinity of a center in the left and right direction to portions of the both left and right side faces of the column cover at the door portion; and wherein the inflator includes a main body having a gas injection port for injecting the expanding gas, and a diffuser connected to the main body and formed in a shape of a cylinder in an axial direction being arranged in the left and right direction, the diffuser restricting a flow direction of the expanding gas injected from the gas injection port; and wherein the main body is formed in a shape of a rod having a head portion provided with the gas injection port at a front end thereof, the main body being provided at a lower side of the steering column such that an axial direction of the main body is along an axial direction of the steering column;

the diffuser comprises openings provided at both left and right ends thereof constituted as flow out ports for making the expanding gas from the head portion of the main body flow toward the portions of the both left and right side faces of the column cover, the gas flow restricting member being constituted by the diffuser, wherein the main body is provided at the lower side of the steering column such that the axial direction of the main body is a direction orthogonal to the axial direction of the diffuser and the diffuser is arranged inside the air bag, the diffuser comprises an integrating hole inserting a side of the head portion of the main body that is inserted through an insertion hole of the air bag and provided at a vicinity of a center of the diffuser in the left and right direction.

8. The knee protecting air bag apparatus according to claim 7, wherein folded portions of both left and right edges of the air bag are formed by folding the both left and right edges by being folded in rolls rolled to a side of the column side wall portion.

9. The knee protecting air bag apparatus according to claim 7, wherein the diffuser is arranged such that an axial direction connecting left and right flow out ports of the diffuser is along a horizontal direction in the left and right direction, and the left and right flow out ports are partially or totally overlapped to the portions of the both left and right side faces of the column cover at the door portion in a state of being projected in the left and right direction.

10. The knee protecting air bag apparatus according to claim 7, the diffuser having a rigidity.

11. The knee protecting air bag apparatus according to claim 7, further comprising a case containing the air bag and the inflator, wherein:

the case is formed by an inverse U-like shape in a cross sectional view and comprises a ceiling wall and side walls extended downward from front and rear edges of the ceiling wall;

at least one of the side walls has an attaching seat that fixes the main body of the inflator to the case, the diffuser is provided with a bolt penetrating the air bag and the ceiling wall and fastened by a nut;

the air bag is arranged when folded so that the bolt of the diffuser that penetrates the ceiling wall and the folded air bag, contains the folded air bag between the side walls; and the side of the head portion of the main body that is inserted between the side walls and inserted inside the diffuser through the insertion hole of the air bag from the integrating hole so that the main body of the inflator is fixed to the attaching seat and the inflator is fixed to the case.

* * * * *